United States Patent
Kurioka et al.

(10) Patent No.: US 6,984,044 B2
(45) Date of Patent: Jan. 10, 2006

(54) PROJECTION OPTICAL SYSTEM, PROJECTION TYPE IMAGE DISPLAY APPARATUS, AND IMAGE DISPLAY SYSTEM

(75) Inventors: Yoshiaki Kurioka, Tokyo (JP); Katsumi Kurematsu, Tokyo (JP); Takayuki Ishii, Tokyo (JP); Toshihiro Sunaga, Tokyo (JP); Sawako Chatani, Port Washington, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 10/630,483

(22) Filed: Jul. 30, 2003

(65) Prior Publication Data

US 2004/0027662 A1 Feb. 12, 2004

(30) Foreign Application Priority Data

| Jul. 30, 2002 | (JP) | 2002-220762 |
| Jul. 30, 2002 | (JP) | 2002-220770 |
| Jul. 30, 2002 | (JP) | 2002-220776 |
| Jul. 30, 2002 | (JP) | 2002-221770 |
| Sep. 24, 2002 | (JP) | 2002-276783 |

(51) Int. Cl.
*G03B 21/28* (2006.01)
*G03B 21/22* (2006.01)
*G03B 21/26* (2006.01)
*G03B 5/10* (2006.01)

(52) U.S. Cl. ............... 353/99; 353/77; 353/37; 353/98; 359/858

(58) Field of Classification Search ............ 353/74–79, 353/98, 99, 69, 70, 122, 100, 101, 102, 10, 353/7, 37; 359/460, 850, 857–859, 867–869; 348/782, 783
See application file for complete search history.

(56) References Cited

U.S. PATENT DOCUMENTS 5,716,118 A * 2/1998 Sato et al. .................... 353/98
5,825,560 A   10/1998 Ogura et al. ................ 359/822

(Continued)

FOREIGN PATENT DOCUMENTS

| EP | 1 139 145 A2 | 10/2001 |
| EP | 1 291 681 A1 | 3/2003 |
| JP | 5-80418 | 4/1993 |
| JP | 5-100312 | 4/1993 |
| JP | 9-5650 | 1/1997 |
| JP | 2786796 | 10/1998 |
| JP | 2001-215412 | 8/2001 |
| JP | 2001-264627 | 9/2001 |
| WO | WO97/01787 | 1/1997 |

*Primary Examiner*—Rodney Fuller
*Assistant Examiner*—Andrew Sever
(74) *Attorney, Agent, or Firm*—Morgan & Finnegan, LLP

(57) ABSTRACT

A projection optical system which can project a bright image with less distortion and a small projection distance without causing aberration or an increase in size of reflective surfaces is disclosed. The projection optical system projects luminous flux from an original image onto a projection surface which is oblique to a central principal ray which is a principal ray of luminous flux traveling from the center of the original image to the center of a projected image. The projection optical system comprises a refractive optical system which includes a plurality of refractive optical elements through which the luminous flux from the original image passes through, and a reflective optical system which includes a plurality of reflective surfaces each having an optical power and guides the luminous flux emerging from the refractive optical system to the projection surface.

16 Claims, 11 Drawing Sheets

U.S. PATENT DOCUMENTS

| | | | |
|---|---|---|---|
| 5,847,887 A | 12/1998 | Ogura et al. | 359/822 |
| 5,871,266 A | 2/1999 | Negishi et al. | |
| 5,999,311 A | 12/1999 | Nanba et al. | 359/365 |
| 6,021,004 A | 2/2000 | Sekita et al. | 359/676 |
| 6,120,156 A | 9/2000 | Akiyama | 359/857 |
| 6,166,859 A | 12/2000 | Inuzuka et al. | 359/633 |
| 6,166,866 A | 12/2000 | Kimura et al. | 359/729 |
| 6,268,963 B1 | 7/2001 | Akiyama | 359/631 |
| 6,278,553 B1 | 8/2001 | Akiyama | 3359/627 |
| 6,292,309 B1 | 9/2001 | Sekita et al. | 359/729 |
| 6,301,064 B1 | 10/2001 | Araki et al. | 359/834 |
| 6,313,942 B1 | 11/2001 | Nanba et al. | 359/365 |
| 6,366,411 B1 | 4/2002 | Kimura et al. | 359/729 |
| 6,426,841 B1 | 7/2002 | Araki et al. | 359/834 |
| 6,459,530 B2 | 10/2002 | Nanba et al. | 359/365 |
| 6,522,475 B2 | 2/2003 | Akiyama et al. | 359/676 |
| 6,529,330 B1 | 3/2003 | Sekita et al. | 359/630 |
| 6,626,541 B2 * | 9/2003 | Sunaga | 353/69 |
| 6,752,500 B1 * | 6/2004 | Yoshii et al. | 353/78 |
| 2002/0008853 A1 | 1/2002 | Sunaga | 353/69 |
| 2002/0105734 A1 | 8/2002 | Kimura et al. | 359/729 |
| 2002/0149854 A1 | 10/2002 | Tanaka et al. | 359/627 |
| 2003/0133082 A1 * | 7/2003 | Sunaga | 353/70 |
| 2003/0137742 A1 | 7/2003 | Akiyama et al. | 359/627 |
| 2004/0032571 A1 * | 2/2004 | Sunaga et al. | 353/77 |

* cited by examiner

PROJECTION OPTICAL SYSTEM, PROJECTION TYPE IMAGE DISPLAY APPARATUS, AND IMAGE DISPLAY SYSTEM

BACKGROUND OF THE INVENTION

1. Field of the Invention

The present invention relates generally to a projection optical system for use in a projection type image display apparatus such as a projector, and more particularly, to a projection optical system for projecting an image onto a projection surface in a direction which is oblique to the projection surface.

2. Description of Related Art

Conventionally, projectors or projection type image display apparatuses have been proposed in which an image forming element is illuminated with light from a light source and the modulated light which is transmitted through the image forming element or reflected by the image forming element is enlargingly projected onto a screen by a projection lens to display an image.

Some of projection optical systems for use in such projectors allow projection in a direction which is oblique to the screen in order to reduce the distance between the screen and the projector.

For example, Japanese Patent Application Laid-Open No. H05(1993)-100312 has proposed a projection optical system which enlargingly projects an image produced on the basis of an original image formed on an image forming element onto a screen. In the projection optical system, a wide-angle lens with a wide field angle is used, and the image forming element and the screen are disposed with a displacement from the optical axis of the projection optical system to use marginal portions of the field angle for the projection, thereby projecting the image in a direction oblique to the screen.

Japanese Patent Application Laid-Open No. H05(1993)-080418 has proposed a projection optical system which forms an intermediate image of luminous flux from an image forming element by a first projection optical system and enlargingly projects the intermediate image onto a screen by a second projection optical system. In the projection optical system, the optical axes of the first and second projection optical systems are appropriately inclined to project the image onto the screen in a direction oblique to the screen.

Domestic re-publication of PCT international publication for patent application WO97/01787 (corresponding to U.S. Pat. No. 5,871,266) has disclosed a projection optical system which realizes oblique projection by using a plurality of reflective surfaces.

Japanese Patent No. 2786796 has disclosed a projection optical system in which light incident on an ellipsoidal mirror at a first focal point is guided to a second focal point which is disposed to match a focal point of a parabolic mirror, and the light guided to the focal point of the inclined parabolic mirror is projected as collimated light onto a screen in a direction oblique to the screen.

Japanese Patent Application Laid-Open No. 2001-264627 has proposed an oblique projection optical system which includes an image forming optical system 602 with a positive optical power and a curved mirror 603 with a negative optical power and provides a positive optical power in total to project an image onto a screen 605, as shown in FIG. 11.

In the projection optical system proposed in Japanese Patent Application Laid-Open No. H05(1993)-100312, since the image forming element and the screen are displaced from the optical axis, a smaller amount of luminous flux passes through an entrance pupil in a portion of the field angle off the optical axis to cause uneven brightness in the projected image. In addition, the displacement of the image forming element from the optical axis leads to an increase in the size of the projection optical system.

In the projection optical system proposed in Japanese Patent Application Laid-Open No. H05(1993)-080418, the lens systems are only tilted. Thus, an increased number of lenses are needed to eliminate an astigmatic difference and sufficiently incline an image surface.

The projection optical system proposed in Domestic re-publication of PCT international publication for patent application WO97/01787 uses one concave mirror and one or two convex mirrors to form a coaxial optical system and projects an image in an oblique direction by partially using reflective surfaces of the concave mirror and the convex mirror(s). When the coaxial optical system is used, however, it is difficult to correct aberration and provide a brighter reflective optical system, that is, have a smaller F number.

In the projection optical system disclosed in Japanese Patent No. 2786796, light rays other than the principal ray do not pass through the first focal point of the ellipsoidal mirror to produce aberration, and the same light rays again cause aberration since the rays do not pass through the second focal point of the ellipsoidal mirror. The image of the light is enlarged at the time of the incidence on the parabolic mirror, so that greater aberration is produced on the screen to significantly degrade performance of image formation.

The projection optical system proposed in Japanese Patent Application Laid-Open No. 2001-264627 does not form an intermediate image since the overall system has the positive optical power. Thus, eliminating distortion of an image without affecting performance of image formation requires the curved mirror with the negative optical power disposed close to the screen, but the curved mirror has a large size.

SUMMARY OF THE INVENTION

It is an object of the present invention to provide a projection optical system which can project a bright image with less distortion and has a short projection distance without causing an increase in aperture, producing aberration due to large decentering, and causing an increase in size of a reflective surface, and a projection type image display apparatus having the projection optical system.

To achieve the object, according to one aspect of the present invention, provided a projection optical system which projects luminous flux from an original image onto a projection surface which is oblique to a central principal ray which is a principal ray of luminous flux traveling from the center of the original image to the center of a projected image. The projection optical system comprises a refractive optical system which includes a plurality of refractive optical elements through which the luminous flux from the original image passes through, and a reflective optical system which includes a plurality of reflective surfaces each having an optical power and guides the luminous flux emerging from the refractive optical system to the projection surface.

These and other characteristics of the projection optical system and the projection type image display apparatus according to the present invention will be apparent from the following description of specific embodiments with reference to the drawings.

DETAILED DESCRIPTION OF THE PREFERRED EMBODIMENTS

Figure 1:
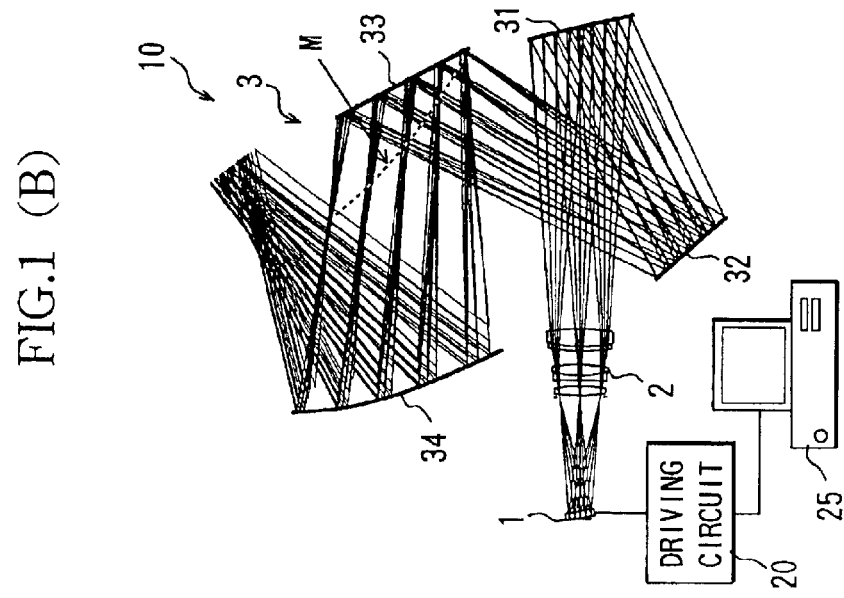
FIG. 1(A) is a schematic diagram showing all optical systems of a rear projector which is Embodiment 1 of the present invention.
FIG. 1(B) is an enlarged view schematically showing a projection optical system of all the optical systems.
Figure 1:
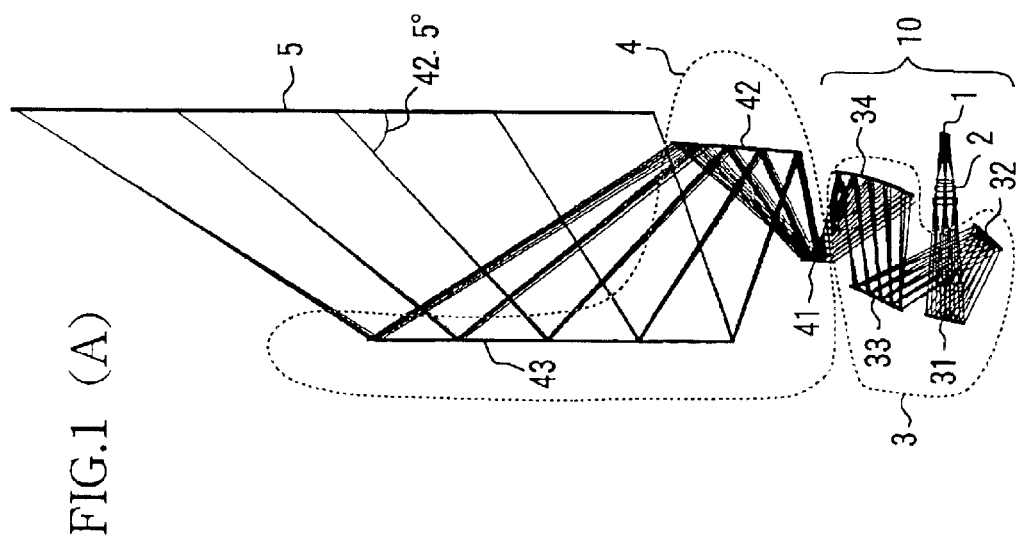

Prior to description of Embodiments of the present invention, description is made for matters common to all of Embodiments.

In Embodiments of the present invention, a light ray emerging from the center of an original image displayed on an image forming element to the center of a projected image on a projection surface through the center of a pupil (an aperture stop) is referred to as a central principal ray (or a reference axis ray).

When the center cannot be defined in azimuthal directions with no symmetry of the image forming element and the pupil (the aperture stop), the barycenter of each of them is defined as the center. However, the present invention is also applicable when a path (a reference axis) of the central principal ray can be considered as the substantial center of each of them in Embodiments of the present invention.

In Embodiments of the present invention, section views and numerical data of optical systems are shown. Projection optical systems of Embodiments have aspheric surfaces which are rotationally asymmetric, and the shape of the surface is represented by the following expression:

$$z = C02y^2 + C20x^2 + C03y^3 + C21x^2y + C04y^4 + C22x^2y^2 + C40x^4 + C05y^5 + C23x^2Y^3 + C41x^4y + C06y^6 + C24x^2y^4 + C42x^4y^2 + C60x^6 \quad (1)$$

Each of the rotationally asymmetric surfaces in Embodiments has a plane-symmetric shape which has a yz plane as a plane of symmetry since the above expression has only even-numbered order terms for x and no odd-numbered order terms.

It should be noted that, while Embodiments of the present invention employ the expression with a sixth order for representing the surface, the present invention is applicable without being limited to any particular order for defining the surface shape. The shape of each surface may be represented by another expression such as the Zernike polynomial.

Next, the concepts in each of Embodiments are described. In a projection type image display apparatus, an image forming element modulates illumination light to form an image (an original image), and a projection optical system enlarges luminous flux emerging from the image forming element and guides the luminous flux to form an image on a projection surface or an image surface.

The projection is performed obliquely such that the central principal ray of the luminous flux guided to the projection surface is projected at an angle not perpendicular to the projection surface. The oblique projection of the projection optical system onto the projection surface causes less interference of a projection of the projection optical system to the projection surface as compared with perpendicular projection when viewed from a direction of the normal line to the projection surface.

An angle between the central principal ray and the normal line to the projection surface, that is, an oblique projection angle may be increased to eliminate the interference, and a plane folding mirror may be used to fold the optical path. This can realize a thin rear projector (a rear projection type image display apparatus), for example.

To enhance performance of image formation, on the projection surface, of light from the original image on the image forming element at a large oblique projection angle, the projection optical system must allow ready correction of an astigmatic difference, curvature of field, distortion, and trapezoidal distortion which occur significantly due to decentering of the image surface.

When an image on an object surface is proportionally enlarged to an image on the image surface, the relationship between the focal length at the azimuth in the decentering direction and the focal length at the azimuth orthogonal thereto is such that the focal length at the azimuth orthogonal to the decentering direction is equal to the value determined by multiplying the focal length at the azimuth in the decentering direction by the cosine of the oblique projection angle if the image surface is decentered to realize the projection optical system of the oblique projection type.

In other words, the focal length depends on the azimuth of the central principal ray. This is described, for example, in Japanese Patent Application Laid-Open No.2001-255462.

Thus, azimuth dependence of the focal length of the overall optical system must be provided by having azimuth dependence of the optical power of each optical surface within the projection optical system for the oblique projection.

To realize such a projection optical system, each of Embodiments of the present invention employs a projection optical system formed of a refractive optical system and a reflective optical system.

For aberration correction to be made by the two optical systems, the refractive optical system mainly corrects spherical aberration and comatic aberration, and reflective surfaces having optical powers of the reflective optical system correct an astigmatic difference, curvature of field, distortion, and trapezoidal distortion which need considerable correction due to the large oblique projection angle.

The ratio of a focal length $f\_a$ of the reflective optical system to a focal length f of the overall projection optical system desirably satisfies the following:

$$|f\_a/f|>2 \qquad (2)$$

As the ratio is smaller, light rays are incident on the reflective optical system at a smaller height. Particularly, when the ratio is equal to or lower than the lower limit in the expression (2), the height of the light rays is extremely small to require stronger azimuth dependence of radius of curvature in order to make correction of azimuth dependence of the focal length necessary for the oblique projection of the central principal ray onto the projection surface. Consequently, other types of aberration are difficult to correct.

The astigmatic difference and curvature of field are corrected by a rotationally asymmetric surface such as a free-form surface, an anamorphic surface, or a toric surface which allows flexible design of the optical power for each azimuth.

When each optical surface is tilted or shifted, the effect of correction of aberration which occurs due to the oblique projection is increased. To provide the optical power varying depending on the azimuth, a rotationally symmetric surface may be decentered.

For optical power distribution between the refractive optical system and the reflective optical system, an excessively great power provided for the refractive optical system in the projection optical system results in an extremely small height of the light ray incident on a reflective surface of the reflective optical system. It is thus difficult to provide azimuth dependence of the optical power acting on the light ray in the reflective optical system. In other words, correction of the astigmatic difference is difficult.

On the other hand, if the optical power of the refractive optical system is excessively reduced, luminous flux is incident on the reflective surface at a light ray height which remains large. In this case, the number of reflective surfaces in the reflective optical system must be increased to correct the astigmatic difference, distortion, and trapezoidal distortion. In addition, luminous flux of the off-axis light ray is diverged to cause an increase in the size of the reflective optical system.

When a plane folding mirror is provided between the reflective optical system and the projection surface, the optical path can be folded before incidence on the inclined projection surface. Thus, the overall optical path can be folded to reduce the thickness. When this is applied, for example, to a rear projector, a thin rear projector can be realized.

When the projection optical system has an intermediate image forming position at an optical surface close to the image surface, the height of the light ray at optical surfaces closer to the image surface becomes smaller to facilitate correction of distortion with optical power distribution which has less influence on the astigmatic difference. In addition, the distortion can be corrected even when the angle (the oblique projection angle) between the central principal ray and the projection surface is large.

When the optical power is asymmetric in the azimuthal direction of 0 and 90 degrees in an optical surface near the intermediate image forming position, a flexible relationship is established between the object height and the focal length, thereby allowing correction of distortion even at a large oblique projection angle.

An optical surface closer to or closest to the intermediate image forming position can be formed as a reflective surface to correct large distortion with a small number of optical surfaces since the reflective surface can provide a larger optical power than the refractive surface.

The concave and convex shapes of the intermediate image forming surface caused by the curvature of field are matched with the concave and convex shapes of an optical surfaces near the intermediate image forming surface, so that the distortion can be corrected favorably.

In the projection optical system, each of optical surfaces having optical powers disposed immediately before and after the intermediate image forming surface may be shaped in the azimuthal directions of 0 and 90 degrees such that the surface has a concave shape toward each azimuthal direction when the refractive optical system has negative curvature of field and the surface has a convex shape toward each azimuthal direction when the refractive optical system has positive curvature of field. This can realize the projection optical system which can correct the distortion with a small number of optical surfaces even at a large angle formed between the central principal ray and the projection surface.

Next, specific embodiments of the present invention are described with reference to the drawings. Design data corresponding to Embodiments 1 to 5 are shown below in Tables 1 to 5 as Numerical Examples 1 to 5.

Table 6 shows values of the expression (2), vertical and horizontal dimensions of image forming elements (for example, reflective type liquid crystal display panels), effective F numbers, vertical and horizontal dimensions of screens (projection surfaces), focal lengths $f\_a$ of refractive optical systems, focal lengths f of projection optical systems in longitudinal directions of the screens, and oblique projection angles θ of central principal rays projected onto the screens, in Numerical Examples 1 to 5.

Embodiment 1

FIG. 1(A) shows the structure of all optical systems of a rear projector (a projection type image display apparatus) which is Embodiment 1 of the present invention. While Embodiment 1 employs a reflective type liquid crystal panel (element) as an image forming element, the present invention is applicable to an apparatus using a transmissive type image forming element. In addition to the liquid crystal element, other image forming elements can be used as the image forming element, such as a self-light-emission element (for example, an organic or inorganic electroluminescence element) and a micromirror device.

FIG. 1(B) shows a projection optical system 10 which is a main part of all the optical systems.

In FIGS. 1(A) and 1(B), reference numeral 1 shows a reflective type liquid crystal panel (the image forming element) which is connected to a driving circuit 20 as shown in FIG. 1(B). The driving circuit 20 receives image information from an image information supply apparatus 25 such as a personal computer, a VCR, a television, a DVD player, a camera (a video camera, a digital camera or the like), a cellular phone, and a radio wave receiver (wired or wireless). An image display system is formed in this manner. The driving circuit 20 drives the reflective type liquid crystal panel 1 such that an original image corresponding to the input image information is displayed on the reflective type liquid crystal panel 1. This structure is also used in other Embodiments later described, although not shown.

Upon incidence of illumination light from an illumination system, not shown, the reflective type liquid crystal panel 1 modulates the light into image light and reflects the light. The image light modulated and reflected by the reflective type liquid crystal panel 1 is first incident on a refractive optical system 2 of the projection optical system 10.

The refractive optical system 2 is disposed at a position closer to the reflective type liquid crystal panel 1 serving as an object surface in all the optical systems, where the refractive optical system 2 receives the light from the reflective type liquid crystal panel 1 at a large height of light rays, and mainly corrects spherical aberration and comatic aberration. The refractive optical system 2 is formed of lenses which are rotationally symmetric with respect to the central principal ray from the reflective type liquid crystal panel 1. The refractive optical system 2 of Embodiment 1 is formed of five spherical lenses. The number of the spherical lenses, however, is not limited thereto in the refractive optical system of the present invention. A rotationally asymmetric spherical surface may also be used in the refractive optical system to improve correction of the spherical aberration.

Reference numeral 3 shows a reflective optical system of the projection optical system 10, on which the image light emerging from the refractive optical system 2 is incident. The reflective optical system 3 is disposed closer to a screen 5 serving as an image surface relative to the refractive optical system 2 in all the optical systems and mainly corrects distortion and trapezoidal distortion.

In Embodiment 1, the reflective optical system 3 is formed of four reflective surfaces (a first to a fourth reflective surface 31 to 34) or mirrors to sequentially reflect the image light from the refractive optical system 2. However, the number of the reflective surfaces is not limited thereto in the reflective optical system of the present invention.

The reflective optical system 3 is preferably formed of three or more reflective surfaces since an astigmatic difference can be favorably corrected, satisfactory performance of image formation is achieved, and the distortion and trapezoidal distortion can be favorably corrected, even the central principal ray is projected onto the screen 5 at a large oblique projection angle of 42.5 degrees as in Embodiment 1.

Figure 2:
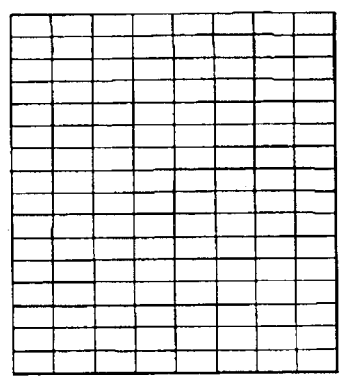
FIG. 2(A) shows distortion of the rear projector shown in FIG. 1(A)
FIG. 2(B) is a spot diagram of the rear projector shown in FIG. 1(A)
Figure 2:
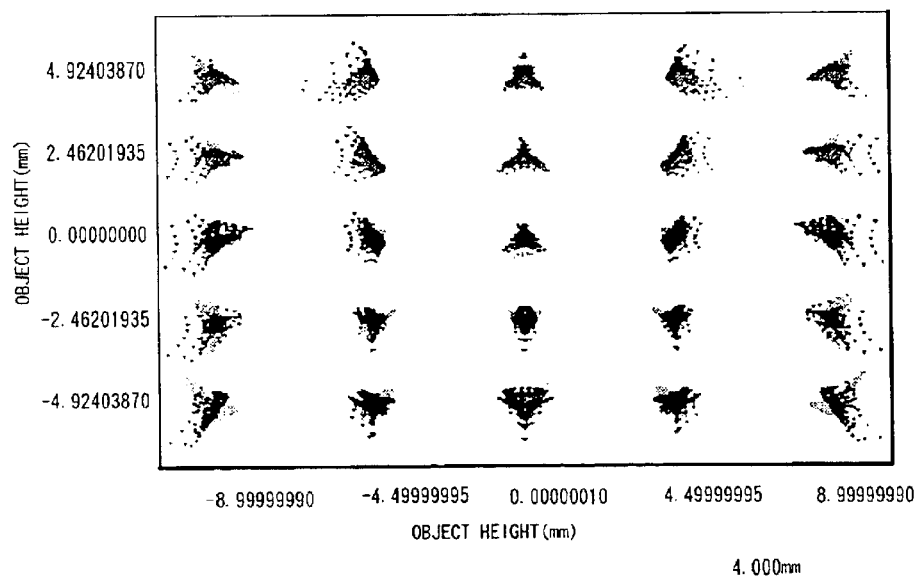

FIG. 2(B) illustrates performance of image formation on the screen of the projection optical system 10 of Embodiment 1. In FIG. 2(B), the horizontal axis and vertical axis represent object heights in a horizontal direction and a vertical direction. FIG. 2(A) shows distortion of an image on the screen. It can be seen from FIG. 2(A) that the projection optical system 10 of Embodiment 1 can excellently correct the distortion and trapezoidal distortion.

In the reflective optical system 3 shown in FIGS. 1(A) and 1(B), each of the first reflective surface 31 and the second reflective surface 32 is disposed at a relatively high position of light rays and corrects azimuth dependence of a focal length and astigmatism. Especially, rotationally asymmetric surfaces used as the first reflective surface 31 and the second reflective surface 32 can provide varying optical powers depending on the azimuth to enhance the effect of correction.

Each of the third reflective surface 33 and the fourth reflective surface 34 is disposed at a position close to an intermediate image forming surface M shown in FIG. 1(B) where they receive light rays at a relatively small height, and corrects the distortion. Especially, the intermediate image forming surface M is provided within the reflective optical system 3 to dispose the reflective surfaces near the intermediate image forming surface M, thereby making it possible to reduce the distortion and trapezoidal distortion without affecting spherical aberration and astigmatism.

In addition, the shape of the intermediate image forming surface M is matched with the shapes of the optical surfaces near the intermediate image forming surface M, so that distortion can be corrected favorably.

Reference numeral 4 in FIG. 1(A) shows a plane mirror unit which is formed of three plane mirrors including a first to a third plane mirror 41 to 43 to sequentially reflect the image light from the projection optical system (reflective optical system 3) such that the image light is folded. This can reduce the depth dimension (in a lateral direction in FIG. 1(A)) required to form an optical path throughout the projector.

While Embodiment 1 is described for the case where the plane mirror unit 4 is formed of the three plane mirrors, the number of the plane mirrors is not limited thereto in the present invention.

The screen 5 is disposed at the image forming surface of the image light emerging from the projection optical system formed of the refractive optical system 2 and the reflective optical system 3 and reflected by the plane mirror unit 4. Thus, a projected image formed by the image light is displayed on the screen 5.

While Embodiment 1 has been described for the case where the image light is projected onto the screen 5 through the plane mirror unit 4, the image light emerging from the projection optical system formed of the refractive optical system 2 and the reflective optical system 3 may be projected onto the screen 5 without passing through the plane mirror unit 4 to form a so-called front projector.

Embodiment 2

Figure 3:
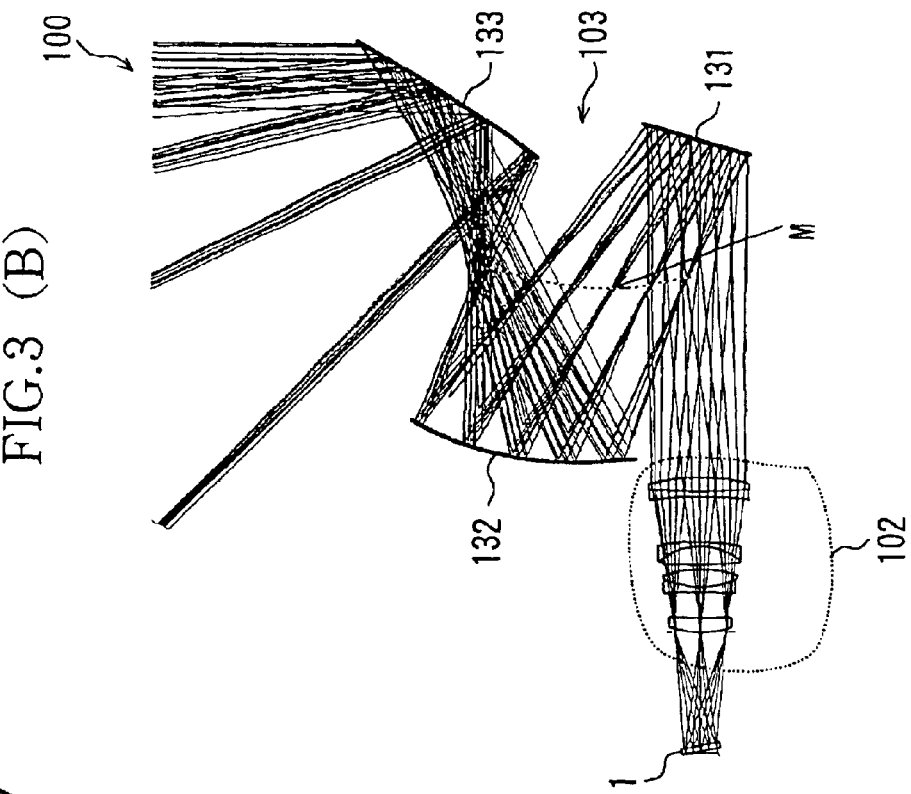
FIG. 3(A) is a schematic diagram showing all optical systems of a rear projector which is Embodiment 2 of the present invention.
FIG. 3(B) is an enlarged view schematically showing a projection optical system of all the optical systems.
Figure 3:
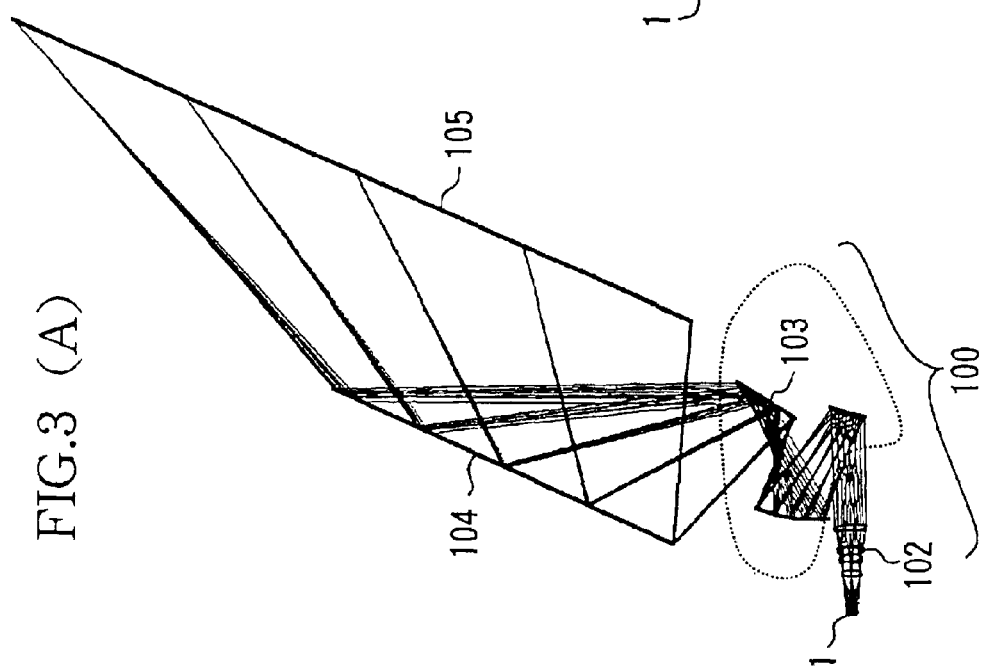

FIG. 3(A) shows all optical systems of a rear projector which is Embodiment 2 of the present invention. FIG. 3(B) shows the structure of a projection optical system 100 which is a main part of all the optical systems.

All the optical systems of Embodiment 2 are composed of a reflective type liquid crystal panel 1, the projection optical system 100, and a single plane mirror 104. The projection optical system 100 is formed of a refractive optical system 102 and a reflective optical system 103 similarly to Embodiment 1.

The refractive optical system 102 is formed of seven rotationally symmetric glass lenses, while the reflective optical system 102 is formed of three reflective surfaces (mirrors) 131 to 133.

An intermediate image forming surface M is provided between the first reflective surface 131 and the second reflective surface 132.

Figure 4:
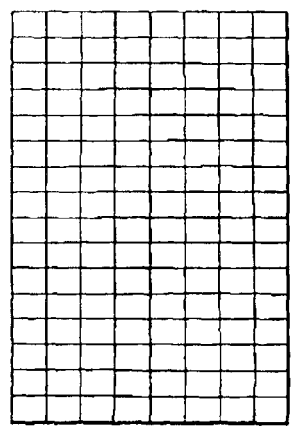
FIG. 4(A) shows distortion of the rear projector shown in FIG. 3(A)
FIG. 4(B) is a spot diagram of the rear projector shown in FIG. 3(A)
Figure 4:
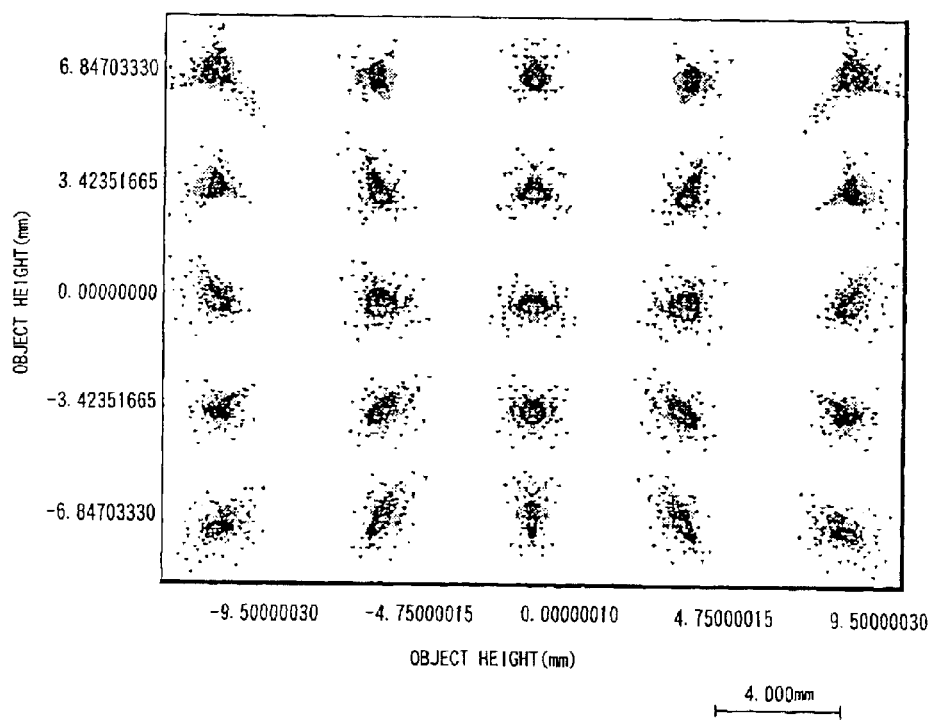

FIG. 4(B) illustrates performance of image formation on a screen of the projection optical system of Embodiment 2. In FIG. 4(B), the horizontal axis and vertical axis are the same as those in FIG. 2(B). FIG. 4(A) shows distortion of an image on the screen. It can be seen from FIG. 4(A) that distortion can be corrected favorably by the projection optical system of Embodiment 2.

Embodiment 3

Figure 5:
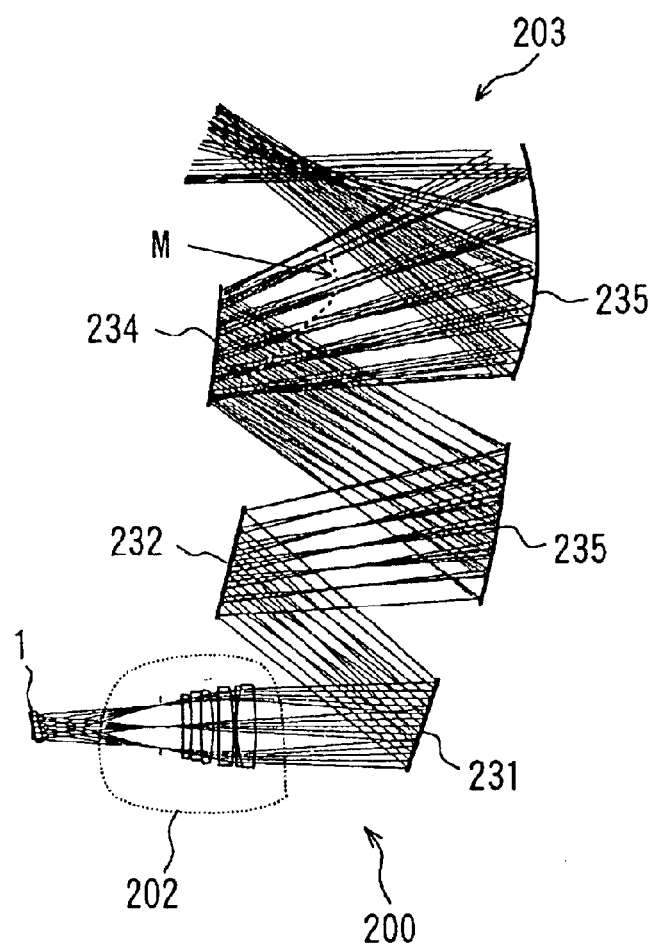
FIG. 5 is a schematic diagram particularly showing a projection optical system of all optical systems of a rear projector which is Embodiment 3 of the present invention.

FIG. 5 shows the structure of a projection optical system 200 which is a main part of all optical systems of a rear projector which is Embodiment 3 of the present invention. Reference numeral 1 shows a reflective type liquid crystal panel.

The projection optical system 200 is formed of a refractive optical system 202 and a reflective optical system 203 similarly to Embodiment 1.

The refractive optical system 202 is formed of six rotationally symmetric glass lenses, while the reflective optical system 203 is formed of five reflective surfaces (mirrors) 231 to 235.

An intermediate image forming surface M is provided closer to the fourth reflective surface 234 between the fourth reflective surface 234 and the fifth reflective surface 235.

Figure 6:
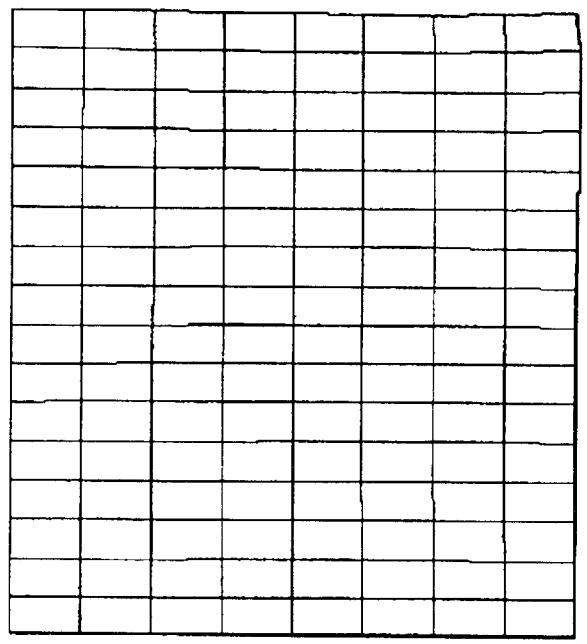
FIG. 6(A) shows distortion of the rear projector shown in FIG. 5.
FIG. 6(B) is a spot diagram of the rear projector shown in FIG. 5.
Figure 6:
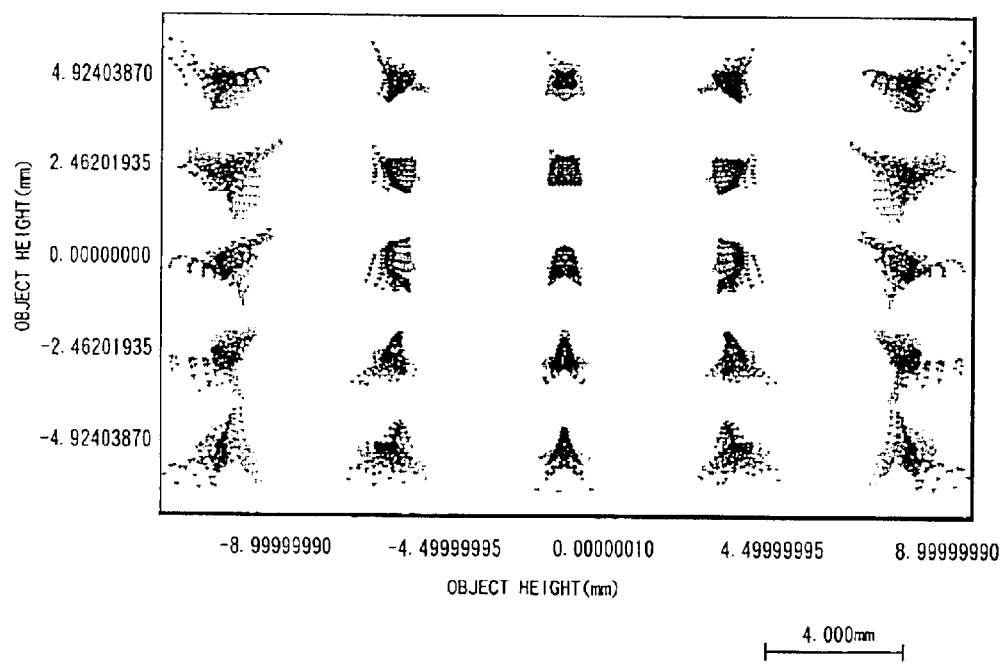

FIG. 6(B) illustrates performance of image formation on a screen of the projection optical system of Embodiment 3. The horizontal axis and the vertical axis in FIG. 6(B) are the same as those in FIG. 2(B). FIG. 6(A) shows distortion of an image on the screen. It can be seen from FIG. 6(A) that distortion can be corrected favorably by the projection optical system of Embodiment 3.

Embodiment 4

Figure 7:
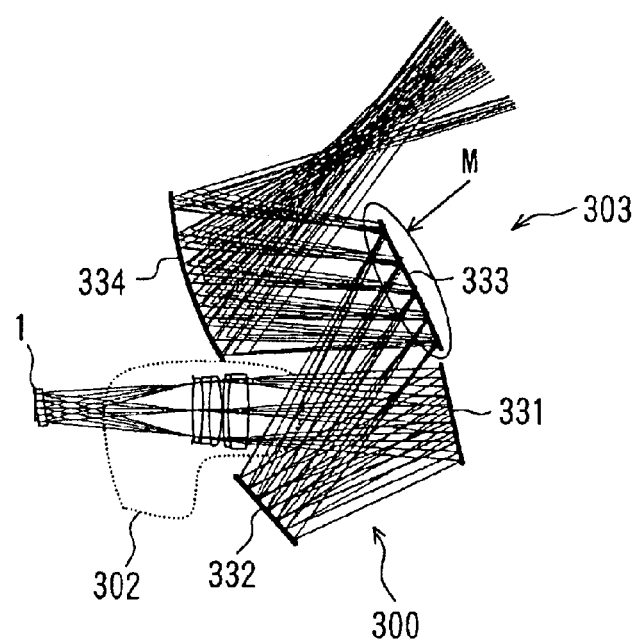
FIG. 7 is a schematic diagram particularly showing a projection optical system of all optical systems of a rear projector which is Embodiment 4 of the present invention.

FIG. 7 shows the structure of a projection optical system 300 which is a main part of all optical systems of a rear projector which is Embodiment 4 of the present invention. Reference numeral 1 shows a reflective type liquid crystal panel.

The projection optical system 300 is formed of a refractive optical system 302 and a reflective optical system 303 similarly to Embodiment 1.

The refractive optical system 302 is formed of five rotationally symmetric glass lenses, while the reflective optical system 303 is formed of four reflective surfaces (mirrors) 331 to 334.

In Embodiment 4, the focal length of the refractive optical system 302 is relatively small at 57 mm (f_a=57 mm), and luminous flux emerges from the refractive optical system 302 with a small width. This is associated with a small height of light rays.

Thus, the light is incident on the first reflective surface 331 at a small height of light rays, and varying optical powers depending on the azimuth are not easily provided in the reflective optical system 300.

In Embodiment 4, an intermediate image forming surface M is formed to extend on both sides of the third reflective surface 333.

The value determined from the expression (2) as the condition of the focal lengths is 4.7 (|f_a/f|=4.7).

Figure 8:
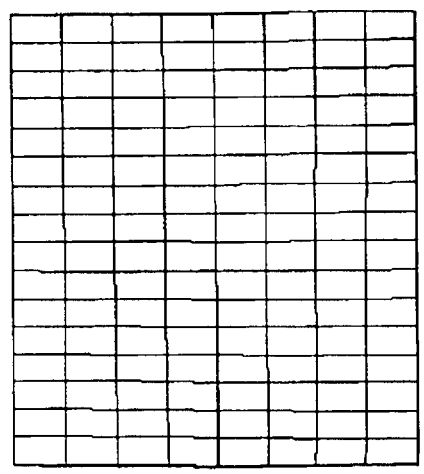
FIG. 8(A) shows distortion of the rear projector shown in FIG. 7.
FIG. 8(B) is a spot diagram of the rear projector shown in FIG. 7.
Figure 8:
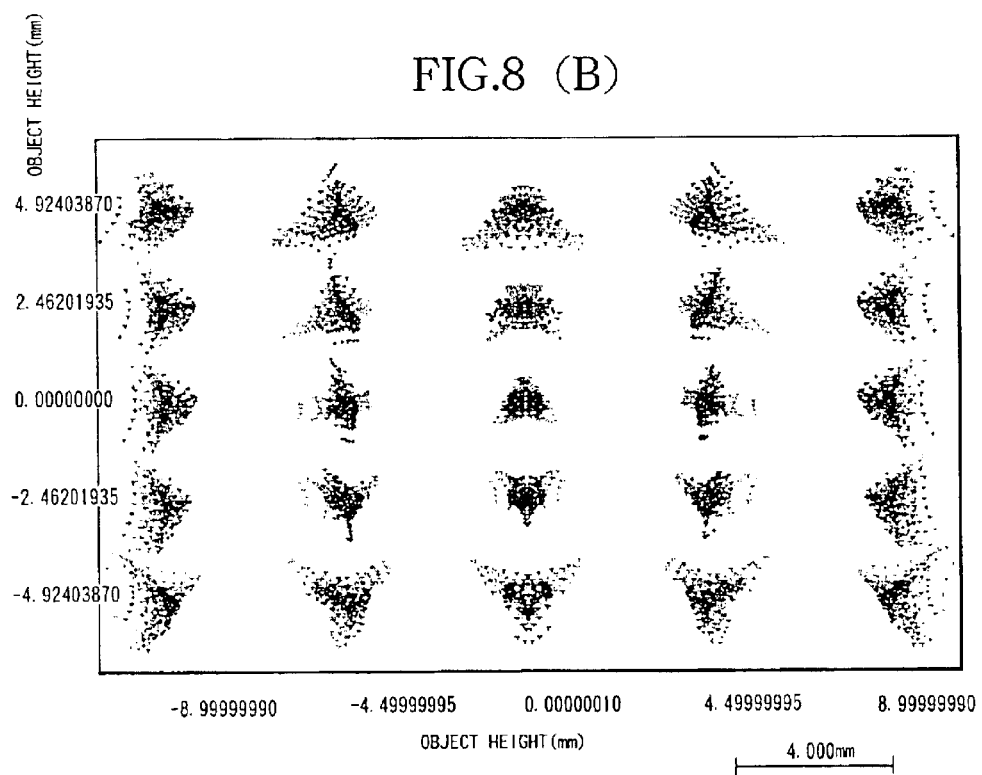

FIG. 8(B) illustrates performance of image formation on a screen of the projection optical system of Embodiment 4. The horizontal axis and the vertical axis in FIG. 8(B) are the same as those in FIG. 2(B). FIG. 8(A) shows distortion of an image on the screen. It can be seen from FIG. 8(A) that distortion can be corrected favorably by the projection optical system of Embodiment 4.

Embodiment 5

Figure 9:
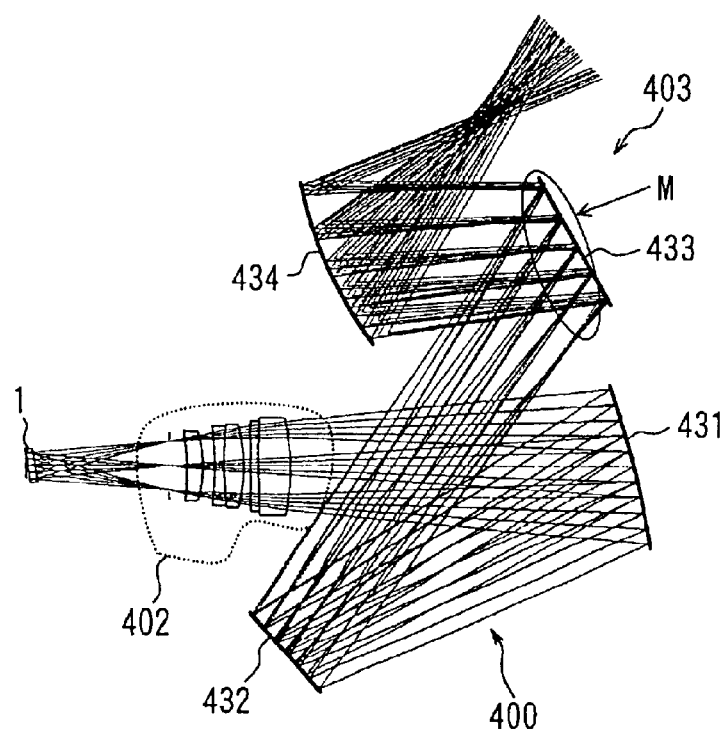
FIG. 9 is a schematic diagram particularly showing a projection optical system of all optical systems of a rear projector which is Embodiment 5 of the present invention.

FIG. 9 shows the structure of a projection optical system 400 which is a main part of all optical systems of a rear projector which is Embodiment 5 of the present invention. Reference numeral 1 shows a reflective type liquid crystal panel.

The projection optical system 400 is formed of a refractive optical system 402 and a reflective optical system 403 similarly to Embodiment 1.

The refractive optical system 402 is formed of five rotationally symmetric glass lenses, while the reflective optical system 403 is formed of four reflective surfaces (mirrors) 431 to 434.

In Embodiment 5, the focal length of the refractive optical system 402 is relatively large at 100 mm (f_a=100 mm), and luminous flux emerges from the refractive optical system 402 with a large width. This is associated with a large height of light rays.

Thus, the light is incident on the first reflective surface 431 at a large height of light rays, but off-axis light rays are subjected to less refraction due to the large focal length. This results in less divergence of the overall luminous flux, so that the first reflective surface 431 can be formed with small dimensions. The value determined in the expression (2) as the condition of the focal lengths is 8.0 (|f_a/f|=8.0).

In Embodiment 5, an intermediate image forming surface M is formed to extend on both sides of the third reflective surface 433.

Figure 10:
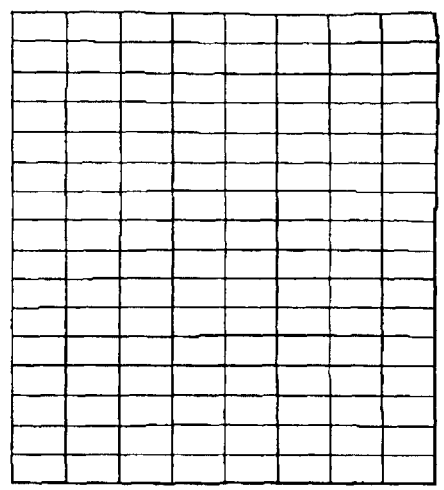
FIG. 10(A) shows distortion of the rear projector shown in FIG. 9.
FIG. 10(B) is a spot diagram of the rear projector shown in FIG. 9.
Figure 10:
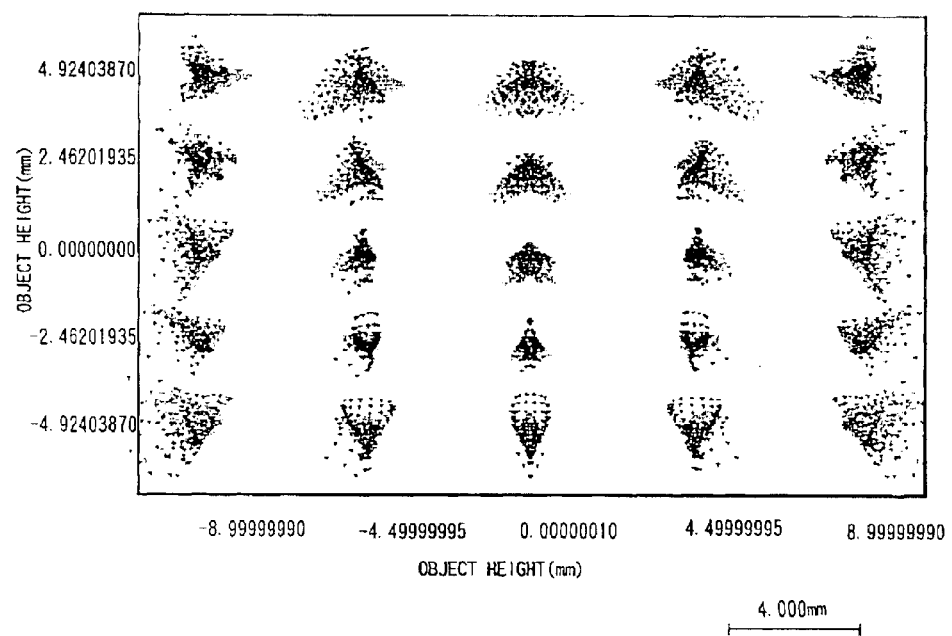
Figure 11:
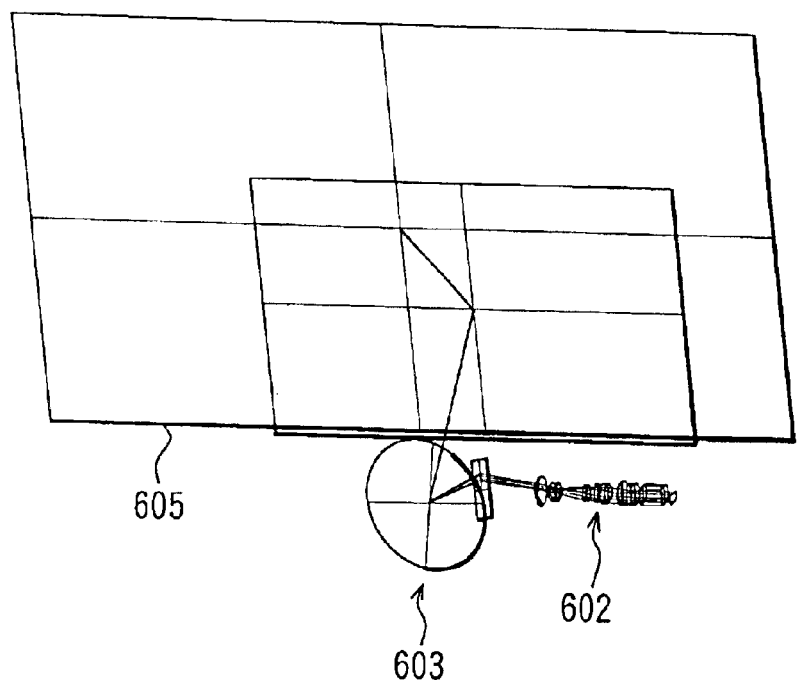
FIG. 11 is a schematic diagram showing a conventional projection optical system.

FIG. 10(B) illustrates performance of image formation on a screen of the projection optical system of Embodiment 5. The horizontal axis and the vertical axis in FIG. 10(B) are the same as those in FIG. 2(B). FIG. 10(A) shows distortion of an image on the screen. It can be seen from FIG. 10(A) that distortion can be corrected favorably by the projection optical system of Embodiment 5.

Numerical Examples (design data) of Embodiments 1 to 5 are shown below.

First, description is made for symbols and the like in Numerical Examples.

When n (n:) is an integer, it represents a surface number. When n is not an integer but "OBJ," "STO," and "IMG" are written instead, the corresponding surface is an object surface, an aperture stop surface, and an image surface, respectively. OBJ corresponds to the surface number 0, and IMG corresponds to the surface number of the final optical surface. For STO, the integer corresponding to n is omitted, and the surface number thereof is determined by adding one to the number n of the preceding surface.

RDY represents a radius of curvature of the surface. THI represents a spacing between the surface and the next surface. RMD represents a reflection mode of the surface. Numerical Examples below show data only in the reflection mode in which all light rays incident on the surface are reflected.

XDE, YDE, and ZDE represent an amount of shifting of the origin of a surface shape from the origin of coordinates of a first surface serving as a reference, and specifically, represent the shifting in a +x direction, a +y direction, and a +z direction, respectively.

ADE, BDE, and CDE represent an amount of tilt of the origin of a surface with respect to the origin of coordinates of the first surface serving as a reference, and specifically, represent the tilt in a −x direction, a −y direction, and a +z direction, respectively, in a right-handed direction.

GLB Gn: the origin and coordinates of a surface are represented by decentering from the origin and coordinates of an Sn surface by the amounts of XDE, YDE, ZDE, ADE, BDE, and CDE.

DAR: when GLB Gn is not specified for a surface, the position of the origin and coordinates of the next surface to the surface are defined by a coordinate system with no decentering from the surface. The origin and coordinates of the next surface are shifted parallel in the +Z direction by a spacing between surfaces specified by THI of the surface.

GLA represents a glass name of a surface represented by a surface number. A blank in the field of the glass name means air.

Description is made for a specific example of a surface shape represented by the following data.

```
14:      85.13274     5.000000     SPHM52_OHARA
XDE: 0.000000  YDE: −0.174089    ZDE: 86.646241    GLB G1
ADE: 0.000000  BDE: 0.000000     CDE: 0.000000
```

This data means the origin of a fourteenth surface positioned on coordinates shifted from the origin of the first surface relative to the coordinates of the first surface by the amounts of 0 in the +x direction, −0.174089 in the +y direction, and 86.646241 in the +z direction, and a right-handed orthogonal coordinate system tilted in a right-handed direction by 0 degrees in the −x direction, the −y direction, and +z direction.

The radius of curvature is 85.13274. The origin and coordinates of the next surface (a fifteenth surface) are at positions shifted parallel in the +z direction by 5.000000 from the origin and coordinates of the fourteenth surface.

When data about a surface shape includes "UDS" in the line next to "n:" representing the surface number, the surface shape of the optical surface, the position of the origin and coordinate system, reflection mode, and glass data are represented as follows:

```
13:     -475.44862    0.000000    REFL
UDS:
C02: -1.0421E-03    C03: 1.3534E-08    C04: 4.3240E-08
C05: 4.4071E-11     C06: -4.7363E-12   C20: -4.3768E-04
C21: 3.0782E-06     C22: 7.3085E-08    C23: -2.3781E-11
C24: -1.3592E-11    C40: 2.6601E-08    C41: 4.0347E-10
C42: -5.0835E-12    C60: 1.9177E-12
XDE: 0.000000       YDE: -0.174        ZDE: 220.54    GLB-
                                                      G1
ADE: -13.421914     BDE: 0.000000      CDE: 0.000000
```

Description is made mainly for data which has been not described in the data shown earlier. The surface number is 13 which means a thirteenth surface. When a coefficient Cjk: (j and k are integers equal to or larger than zero) is written, for example, as follows:

$$C42: -5.0835E-12$$

then it means that −5.0835E−12 is substituted into the coefficient C42 in the expression (1). "E-X" represents "$\times 10^{-X}$". The function derived by similarly substituting all coefficients Cjk into the expression (1) represents the shape of the surface.

TABLE 1

Numerical Example 1

| | RDY | THI | RMD | GLA | |
|---|---|---|---|---|---|
| OBJ: | INFINITY | 0.000000 | | | |
| XDE: 0.000000 | YDE: 0.000000 | | ZDE: 0.000000 | DAR | |
| ADE: -10.000000 | BDE: 0.000000 | | CDE: 0.000000 | | |
| >1: | INFINITY | 0.000000 | | | |
| >1: | INFINITY | 0.000000 | | | |
| 2: | INFINITY | 0.000000 | | SBSL7_OHARA | |
| XDE: 0.000000 | YDE: 0.000000 | | ZDE: 0.507713 | GLB | |
| | | | | | G1 |
| ADE: -10.000000 | BDE: 0.000000 | | CDE: 0.000000 | | |
| 3: | INFINITY | 0.000000 | | | |
| XDE: 0.000000 | YDE: 0.000000 | | ZDE: 3.553892 | GLB | |
| | | | | | G1 |
| ADE: -10.000000 | BDE: 0.000000 | | CDE: 0.000000 | | |
| STO: | INFINITY | 0.000000 | | | |
| XDE: 0.000000 | YDE: -0.174089 | | ZDE: 54.034379 | GLB | |
| | | | | | G1 |
| ADE: 0.000000 | BDE: 0.000000 | | CDE: 0.000000 | | |
| 5: | 150.36240 | 0.000000 | | SFSL5_OHARA | |
| XDE: 0.000000 | YDE: -0.174089 | | ZDE: 55.263940 | GLB | |
| | | | | | G1 |
| ADE: 0.000000 | BDE: 0.000000 | | CDE: 0.000000 | | |
| 6: | -50.01189 | 0.000000 | | | |
| XDE: 0.000000 | YDE: -0.174089 | | ZDE: 59.263940 | GLB | |
| | | | | | G1 |
| ADE: 0.000000 | BDE: 0.000000 | | CDE: 0.000000 | | |
| 7: | -92.24522 | 0.000000 | | SLAH60_OHARA | |
| XDE: 0.000000 | YDE: -0.174089 | | ZDE: 62.263940 | GLB | |
| | | | | | G1 |
| ADE: 0.000000 | BDE: 0.000000 | | CDE: 0.000000 | | |
| 7: | 68.21463 | 0.000000 | | SNSL36_OHARA | |
| XDE: 0.000000 | YDE: -0.174089 | | ZDE: 62.263940 | GLB | |
| | | | | | G1 |
| ADE: 0.000000 | BDE: 0.000000 | | CDE: 0.000000 | | |
| 9: | -54.40654 | 0.000000 | | | |
| XDE: 0.000000 | YDE: -0.174089 | | ZDE: 62.263940 | GLB | |
| | | | | | G1 |

TABLE 1-continued

Numerical Example 1

| | RDY | THI | RMD | GLA | |
|---|---|---|---|---|---|
| ADE: 0.000000 | BDE: 0.000000 | | CDE: 0.000000 | | |
| 10: | 126.65317 | 0.000000 | | SLAH60_OHARA | |
| XDE: 0.000000 | YDE: -0.174089 | | ZDE: 75.548408 | GLB | |
| | | | | | G1 |
| ADE: 0.000000 | BDE: 0.000000 | | CDE: 0.000000 | | |
| 11: | 84.51358 | 0.000000 | | SFSL5_OHARA | |
| XDE: 0.000000 | YDE: -0.174089 | | ZDE: 77.548408 | GLB | |
| | | | | | G1 |
| ADE: 0.000000 | BDE: 0.000000 | | CDE: 0.000000 | | |
| 12: | -98.44155 | 0.000000 | | | |
| XDE: 0.000000 | YDE: -0.174089 | | ZDE: 85.548408 | GLB | |
| | | | | | G1 |
| ADE: 0.000000 | BDE: 0.000000 | | CDE: 0.000000 | | |
| 13: | -475.44862 | 0.000000 | | REFL | |
| UDS: | | | | | |
| C02: -1.0421E-03 | C03: 1.3534E-08 | | C04: 4.3240E-08 | | |
| C05: 4.4071E-11 | C06: -4.7363E-12 | | C20: -4.3768E-04 | | |
| C21: 3.0782E-06 | C22: 7.3085E-08 | | C23: -2.3781E-11 | | |
| C24: -1.3592E-11 | C40: 2.6601E-08 | | C41: 4.0347E-10 | | |
| C42: -5.0835E-12 | C60: 1.9177E-12 | | | | |
| XDE: 0.000000 | YDE: -0.174089 | | ZDE: 220.548408 | GLB | |
| | | | | | G1 |
| ADE: -13.421914 | BDE: 0.000000 | | CDE: 0.000000 | | |
| 14: | -576.18087 | 0.000000 | | REFL | |
| UDS: | | | | | |
| C02: -8.6142E-04 | C03: 5.4898E-06 | | C04: 9.1071E-08 | | |
| C05: 1.7782E-10 | C06: -2.9828E-11 | | C20: 6.4754E-04 | | |
| C21: 9.2622E-06 | C22: 4.1228E-08 | | C23: 1.6016E-10 | | |
| C24: -4.3180E-11 | C40: -1.1311E-08 | | C41: 8.7024E-10 | | |
| C42: -1.9390E-11 | C60: -3.5901E-13 | | | | |
| XDE: 0.000000 | YDE: 49.497533 | | ZDE: 122.401936 | GLB | |
| | | | | | G1 |
| ADE: -42.843829 | BDE: 0.000000 | | CDE: 0.000000 | | |
| 15: | -9686.82349 | 0.000000 | | REFL | |
| UDS: | | | | | |
| C02: 1.0000E-05 | C03: 6.6212E-06 | | C04: 1.6623E-07 | | |
| C05: 2.1998E-09 | C06: -3.0741E-19 | | C20: 1.2500E-03 | | |
| C21: 1.2952E-05 | C22: 8.0875E-08 | | C23: 4.2216E-09 | | |
| C24: 3.6013E-11 | C40: -1.2003E-07 | | C41: 3.3227E-09 | | |
| C42: 2.2746E-11 | C60: 5.6065E-12 | | | | |
| XDE: 0.000000 | YDE: -74.587707 | | ZDE: 197.420954 | GLB | |
| | | | | | G1 |
| ADE: -26.843829 | BDE: 0.000000 | | CDE: 0.000000 | | |
| 16: | 177.53352 | 0.000000 | | REFL | |
| UDS: | | | | | |
| C02: 2.5656E-03 | C03: -9.5763E-06 | | C04: 6.4378E-08 | | |
| C05: -2.0214E-11 | C06: -1.7730E-12 | | C20: 4.2351E-03 | | |
| C21: -1.8406E-05 | C22: 1.2069E-07 | | C23: -2.5036E-10 | | |
| C24: 6.7620E-13 | C40: 1.0527E-09 | | C41: 1.5749E-10 | | |
| C42: -1.8899E-13 | C60: 3.3698E-13 | | | | |
| XDE: 0.000000 | YDE: -87.618965 | | ZDE: 53.007706 | GLB | |
| | | | | | G1 |
| ADE: -16.186914 | BDE: 0.000000 | | CDE: 0.000000 | | |
| 17: | INFINITY | 0.000000 | | | |
| XDE: 0.000000 | YDE: -163.766059 | | ZDE: 152.137017 | GLB | |
| | | | | | G1 |
| ADE: -37.530000 | BDE: 0.000000 | | CDE: 0.000000 | | |
| 18: | INFINITY | 840.000000 | AIR | | |
| XDE: 0.000000 | YDE: -163.766059 | | ZDE: 152.137017 | GLB | |
| | | | | | G1 |
| ADE: -37.530000 | BDE: 0.000000 | | CDE: 0.000000 | | |
| IMG: | INFINITY | 0.000000 | | | |
| XDE: 0.000000 | YDE: 0.000000 | | ZDE: 0.000000 | DAR | |
| ADE: 42.530000 | BDE: 0.000000 | | CDE: 0.000000 | | |

TABLE 2

Numerical Example 2

| | RDY | THI | RMD | GLA |
|---|---|---|---|---|
| OBJ: | INFINITY | 0.000000 | | |
| XDE: 0.000000 | YDE: 0.000000 | | ZDE: 0.000000 | DAR |
| ADE: 12.000000 | BDE: 0.000000 | | CDE: 0.000000 | |
| >1: | INFINITY | 0.000000 | | |
| 2: | INFINITY | 0.000000 | | SBSL7_OHARA |
| XDE: 0.000000 | YDE: 0.000000 | | ZDE: 0.511170 | GLB G1 |
| ADE: 12.000000 | BDE: 0.000000 | | CDE: 0.000000 | |
| 3: | INFINITY | 0.000000 | | |
| XDE: 0.000000 | YDE: 0.000000 | | ZDE: 3.578192 | GLB G1 |
| ADE: 12.000000 | BDE: 0.000000 | | CDE: 0.000000 | |
| STO: | INFINITY | 0.000000 | | |
| XDE: 0.000000 | YDE: 0.209714 | | ZDE: 51.807426 | GLB G1 |
| ADE: 0.000000 | BDE: 0.000000 | | CDE: 0.000000 | |
| 5: | 51.55033 | 0.000000 | | STIH53_OHARA |
| XDE: 0.000000 | YDE: 0.209714 | | ZDE: 51.907426 | GLB G1 |
| ADE: 0.000000 | BDE: 0.000000 | | CDE: 0.000000 | |
| 6: | 799.18006 | 0.000000 | | |
| XDE: 0.000000 | YDE: 0.209714 | | ZDE: 57.907426 | GLB G1 |
| ADE: 0.000000 | BDE: 0.000000 | | CDE: 0.000000 | |
| 7: | −371.00181 | 0.000000 | | STIH14_OHARA |
| XDE: 0.000000 | YDE: 0.209714 | | ZDE: 69.369649 | GLB G1 |
| ADE: 0.000000 | BDE: 0.000000 | | CDE: 0.000000 | |
| 8: | 35.66047 | 0.000000 | | |
| XDE: 0.000000 | YDE: 0.209714 | | ZDE: 71.369649 | GLB G1 |
| ADE: 0.000000 | BDE: 0.000000 | | CDE: 0.000000 | |
| 9: | 35.66047 | 0.000000 | | SFSL5_OHARA |
| XDE: 0.000000 | YDE: 0.209714 | | ZDE: 71.369649 | GLB G1 |
| ADE: 0.000000 | BDE: 0.000000 | | CDE: 0.000000 | |
| 10: | −49.42587 | 0.000000 | | |
| XDE: 0.000000 | YDE: 0.209714 | | ZDE: 78.893922 | GLB G1 |
| ADE: 0.000000 | BDE: 0.000000 | | CDE: 0.000000 | |
| 11: | INFINITY | 0.000000 | | |
| XDE: 0.000000 | YDE: 0.209714 | | ZDE: 78.993922 | GLB G1 |
| ADE: 0.000000 | BDE: 0.000000 | | CDE: 0.000000 | |
| 12: | 333.80929 | 0.000000 | | SFSL5_OHARA |
| XDE: 0.000000 | YDE: 0.209714 | | ZDE: 80.993922 | GLB G1 |
| ADE: 0.000000 | BDE: 0.000000 | | CDE: 0.000000 | |
| 13: | −26.69819 | 0.000000 | AIR | |
| XDE: 0.000000 | YDE: 0.209714 | | ZDE: 88.993922 | GLB G1 |
| ADE: 0.000000 | BDE: 0.000000 | | CDE: 0.000000 | |
| 14: | 26.69819 | 0.000000 | | STIH14_OHARA |
| XDE: 0.000000 | YDE: 0.209714 | | ZDE: 88.993922 | GLB G1 |
| ADE: 0.000000 | BDE: 0.000000 | | CDE: 0.000000 | |
| 15: | −75.89572 | 0.000000 | | |
| XDE: 0.000000 | YDE: 0.209714 | | ZDE: 90.993922 | GLB G1 |
| ADE: 0.000000 | BDE: 0.000000 | | CDE: 0.000000 | |
| 16: | −144.20675 | 0.000000 | | STIM22_OHARA |
| XDE: 0.000000 | YDE: 0.209714 | | ZDE: 110.832117 | GLB G1 |
| ADE: 0.000000 | BDE: 0.000000 | | CDE: 0.000000 | |
| 17: | 220.20414 | 0.000000 | | |
| XDE: 0.000000 | YDE: 0.209714 | | ZDE: 112.732117 | GLB G1 |
| ADE: 0.000000 | BDE: 0.000000 | | CDE: 0.000000 | |
| 18: | 220.20414 | 0.000000 | | STIH53_OHARA |
| XDE: 0.000000 | YDE: 0.209714 | | ZDE: 112.732117 | GLB G1 |
| ADE: 0.000000 | BDE: 0.000000 | | CDE: 0.000000 | |
| 19: | −86.83039 | 0.000000 | | |
| XDE: 0.000000 | YDE: 0.209714 | | ZDE: 119.095822 | GLB G1 |

TABLE 2-continued

Numerical Example 2

| | RDY | THI | RMD | GLA |
|---|---|---|---|---|
| ADE: 0.000000 | BDE: 0.000000 | | CDE: 0.000000 | |
| 20: | 333.01970 | 0.000000 | REFL | |
| UDS: | | | | |
| C02: 1.5692E−03 | C03: −2.5402E−05 | | C04: 3.9380E−07 | |
| C05: −1.4236E−09 | C06: −5.9631E−12 | | C20: 1.1891E−03 | |
| C21: −1.8773E−05 | C22: 7.8122E−07 | | C23: −9.6285E−09 | |
| C24: 3.8581E−11 | C40: 1.2704E−07 | | C41: −3.9562E−09 | |
| C42: 1.7082E−11 | C60: 1.9672E−11 | | | |
| XDE: 0.000000 | YDE: −24.790286 | | ZDE: 254.938227 | GLB G1 |
| ADE: −12.000000 | BDE: 0.000000 | | CDE: 0.000000 | |
| 21: | 154.77744 | 0.000000 | REFL | |
| UDS: | | | | |
| C02: 3.1081E−03 | C03: 1.2200E−05 | | C04: 4.8036E−08 | |
| C05: 9.3762E−10 | C06: 3.1956E−12 | | C20: 4.5729E−03 | |
| C21: 1.9204E−05 | C22: 1.2304E−07 | | C23: 1.4581E−09 | |
| C24: 2.0784E−12 | C40: 2.9355E−08 | | C41: 4.4342E−10 | |
| C42: −1.3385E−12 | C60: −8.7721E−13 | | | |
| XDE: 0.000000 | YDE: 70.694664 | | ZDE: 126.566939 | GLB G1 |
| ADE: −6.000000 | BDE: 0.000000 | | CDE: 0.000000 | |
| 22: | −756.77260 | 0.000000 | REFL | |
| UDS: | | | | |
| C02: −4.7524E−04 | C03: −5.5600E−08 | | C04: 1.5167E−08 | |
| C05: −2.3281E−10 | C06: 1.2343E−12 | | C20: −1.1111E−04 | |
| C21: −3.1594E−06 | C22: 2.7694E−08 | | C23: −2.1455E−11 | |
| C24: −1.6486E−12 | C40: −3.2276E−09 | | C41: 1.1808E−10 | |
| C42: −1.3083E−12 | C60: −1.9889E−13 | | | |
| XDE: 0.000000 | YDE: 98.244332 | | ZDE: 274.062165 | GLB G1 |
| ADE: −32.595876 | BDE: 0.000000 | | CDE: 0.000000 | |
| 23: | INFINITY | 0.000000 | REFL | |
| XDE: 0.000000 | YDE: 439.535441 | | ZDE: 196.471061 | GLB G1 |
| ADE: −25.191752 | BDE: 0.000000 | | CDE: 0.000000 | |
| 24: | INFINITY | 0.000000 | | |
| XDE: 0.000000 | YDE: 637.325349 | | ZDE: 587.888510 | GLB G1 |
| ADE: −25.191752 | BDE: 0.000000 | | CDE: 0.000000 | |
| 25: | INFINITY | 0.000000 | | |
| XDE: 0.000000 | YDE: 637.325349 | | ZDE: 587.888510 | GLB G1 |
| ADE: −25.191752 | BDE: 0.000000 | | CDE: 0.000000 | |
| 26: | INFINITY | 0.000000 | | |
| XDE: 0.000000 | YDE: 637.325349 | | ZDE: 587.888510 | GLB G1 |
| ADE: −25.191752 | BDE: 0.000000 | | CDE: 0.000000 | |
| IMG: | INFINITY | 0.000000 | | |
| XDE: 0.000000 | YDE: 0.000000 | | ZDE: 0.000000 | DAR |
| ADE: 0.000000 | BDE: 0.000000 | | CDE: 0.000000 | |

TABLE 3

Numerical Example 3

| | RDY | THI | RMD | GLA |
|---|---|---|---|---|
| OBJ: | INFINITY | 0.000000 | | |
| XDE: 0.000000 | YDE: 0.000000 | | ZDE: 0.000000 | DAR |
| ADE: −10.000000 | BDE: 0.000000 | | CDE: 0.000000 | |
| >1: | INFINITY | 0.000000 | | |
| 2: | INFINITY | 0.000000 | | SBSL7_OHARA |
| XDE: 0.000000 | YDE: 0.000000 | | ZDE: 0.507713 | GLB G1 |
| ADE: −10.000000 | BDE: 0.000000 | | CDE: 0.000000 | |
| 3: | INFINITY | 0.000000 | | |
| XDE: 0.000000 | YDE: 0.000000 | | ZDE: 3.553892 | GLB G1 |
| ADE: −10.000000 | BDE: 0.000000 | | CDE: 0.000000 | |
| STO: | INFINITY | 0.000000 | | |
| XDE: 0.000000 | YDE: −0.174089 | | ZDE: 54.000762 | GLB G1 |

TABLE 3-continued

Numerical Example 3

| | RDY | THI | RMD | GLA |
|---|---|---|---|---|
| | ADE: 0.000000 | BDE: 0.000000 | CDE: 0.000000 | |
| 5: | −112.90012 | 0.000000 | | SFPL51_OHARA |
| XDE: 0.000000 | YDE: −0.174089 | | ZDE: 63.332130 | GLB G1 |
| | ADE: 0.000000 | BDE: 0.000000 | CDE: 0.000000 | |
| 6: | −87.95475 | 0.000000 | | |
| XDE: 0.000000 | YDE: −0.174089 | | ZDE: 66.784623 | GLB G1 |
| | ADE: 0.000000 | BDE: 0.000000 | CDE: 0.000000 | |
| 7: | −113.44236 | 0.000000 | | SLAH63_OHARA |
| XDE: 0.000000 | YDE: −0.174089 | | ZDE: 67.372727 | GLB G1 |
| | ADE: 0.000000 | BDE: 0.000000 | CDE: 0.000000 | |
| 8: | 481.88529 | 0.000000 | | SPHM52_OHARA |
| XDE: 0.000000 | YDE: −0.174089 | | ZDE: 70.906774 | GLB G1 |
| | ADE: 0.000000 | BDE: 0.000000 | CDE: 0.000000 | |
| 9: | −56.81882 | 0.000000 | | |
| XDE: 0.000000 | YDE: −0.174089 | | ZDE: 76.590255 | GLB G1 |
| | ADE: 0.000000 | BDE: 0.000000 | CDE: 0.000000 | |
| 10: | −29111.03765 | 0.000000 | | SFPL51_OHARA |
| XDE: 0.000000 | YDE: −0.174089 | | ZDE: 78.095618 | GLB G1 |
| | ADE: 0.000000 | BDE: 0.000000 | CDE: 0.000000 | |
| 11: | −79.33847 | 0.000000 | | |
| XDE: 0.000000 | YDE: −0.174089 | | ZDE: 85.429518 | GLB G1 |
| | ADE: 0.000000 | BDE: 0.000000 | CDE: 0.000000 | |
| 12: | −2973.93001 | 0.000000 | | SNBH8_OHARA |
| XDE: 0.000000 | YDE: −0.174089 | | ZDE: 86.394195 | GLB G1 |
| | ADE: 0.000000 | BDE: 0.000000 | CDE: 0.000000 | |
| 13: | 85.13274 | 0.000000 | | SPHM52_OHARA |
| XDE: 0.000000 | YDE: −0.174089 | | ZDE: 86.646241 | GLB G1 |
| | ADE: 0.000000 | BDE: 0.000000 | CDE: 0.000000 | |
| 14: | −137.12810 | 0.000000 | | |
| XDE: 0.000000 | YDE: −0.174089 | | ZDE: 94.625320 | GLB G1 |
| | ADE: 0.000000 | BDE: 0.000000 | CDE: 0.000000 | |
| 15: | −5263.27597 | 0.000000 | REFL | |
| UDS: | | | | |
| C02: −8.0153E−05 | C03: −2.1390E−06 | C04: −4.6612E−08 | | |
| C05: 2.9412E−10 | C06: 1.1624E−11 | C20: −4.8611E−04 | | |
| C21: −3.8497E−06 | C22: −1.9078E−08 | C23: 3.3357E−10 | | |
| C24: 2.9493E−11 | C40: −4.6113E−09 | C41: 3.4122E−11 | | |
| C42: −1.4088E−11 | C60: −4.0244E−12 | | | |
| XDE: 0.000000 | YDE: −0.174089 | | ZDE: 164.640376 | GLB G1 |
| | ADE: 19.996853 | BDE: 0.000000 | CDE: 0.000000 | |
| 16: | −1024.07725 | 0.000000 | REFL | |
| UDS: | | | | |
| C02: −4.3074E−04 | C03: −9.9627E−06 | C04: −1.7549E−07 | | |
| C05: −8.5322E−10 | C06: −1.4868E−11 | C20: −1.0726E−03 | | |
| C21: −2.1039E−05 | C22: −1.8772E−07 | C23: −2.5374E−09 | | |
| C24: 1.9444E−12 | C40: −2.4834E−08 | C41: −2.2646E−09 | | |
| C42: −3.0846E−11 | C60: −1.6474E−11 | | | |
| XDE: 0.000000 | YDE: −67.663406 | | ZDE: 84.191796 | GLB G1 |
| | ADE: 14.993565 | BDE: 0.000000 | CDE: 0.000000 | |
| 17: | −430.10066 | 0.000000 | REFL | |
| UDS: | | | | |
| C02: −1.1063E−03 | C03: −7.6973E−06 | C04: −5.3566E−08 | | |
| C05: 7.8632E−10 | C06: −2.7924E−12 | C20: −6.5187E−04 | | |
| C21: −1.5238E−05 | C22: 3.3919E−08 | C23: −1.2372E−10 | | |
| C24: −2.4055E−12 | C40: 3.3204E−08 | C41: −1.1056E−09 | | |
| C42: 1.1430E−11 | C60: −1.8272E−12 | | | |
| XDE: 0.000000 | YDE: −87.645086 | | ZDE: 197.437511 | GLB G1 |
| | ADE: 9.992618 | BDE: 0.000000 | CDE: 0.000000 | |
| 18: | −284.47384 | 0.000000 | REFL | |
| UDS: | | | | |
| C02: −1.6663E−03 | C03: −1.8203E−05 | C04: −7.4191E−07 | | |
| C05: −5.9931E−09 | C06: −9.9019E−11 | C20: −4.9757E−05 | | |

TABLE 3-continued

Numerical Example 3

| | RDY | THI | RMD | GLA |
|---|---|---|---|---|
| C21: −7.9485E−06 | C22: −1.5758E−07 | C23: −9.4057E−09 | | |
| C24: −1.8063E−10 | C40: 7.6347E−08 | C41: −1.8720E−09 | | |
| C42: −3.5187E−11 | C60: −2.7941E−12 | | | |
| XDE: 0.000000 | YDE: −156.259051 | | ZDE: 78.555415 | GLB G1 |
| | ADE: 7.495871 | BDE: 0.000000 | CDE: 0.000000 | |
| 19: | −152.65281 | 0.000000 | REFL | |
| UDS: | | | | |
| C02: −3.0700E−03 | C03: 1.0401E−05 | C04: −5.3480E−08 | | |
| C05: −3.8871E−10 | C06: 5.9757E−12 | C20: −3.8750E−03 | | |
| C21: 1.5556E−05 | C22: −4.3126E−08 | C23: −7.1974E−10 | | |
| C24: 4.4399E−12 | C40: 3.8167E−08 | C41: −5.3764E−10 | | |
| C42: 8.8297E−14 | C60: 2.0046E−12 | | | |
| XDE: 0.000000 | YDE: −192.495471 | | ZDE: 213.790899 | GLB G1 |
| | ADE: 4.929598 | BDE: 0.000000 | CDE: 0.000000 | |
| 20: | INFINITY | 0.000000 | | |
| XDE: 0.000000 | YDE: −255.554100 | | ZDE: 77.689432 | GLB G1 |
| | ADE: 24.859267 | BDE: 0.000000 | CDE: 0.000000 | |
| 21: | INFINITY | −770.000000 | | |
| XDE: 0.000000 | YDE: −255.554100 | | ZDE: 77.689432 | GLB G1 |
| | ADE: 24.859267 | BDE: 0.000000 | CDE: 0.000000 | |
| IMG: | INFINITY | 0.000000 | | |
| XDE: 0.000000 | YDE: 0.000000 | | ZDE: 0.000000 | DAR |
| ADE: −42.530000 | BDE: 0.000000 | CDE: 0.000000 | | |

TABLE 4

Numerical Example 4

| | RDY | THI | RMD | GLA |
|---|---|---|---|---|
| OBJ: | INFINITY | 0.000000 | | |
| XDE: 0.000000 | YDE: 0.000000 | | ZDE: 0.000000 | DAR |
| ADE: −10.000000 | BDE: 0.000000 | CDE: 0.000000 | | |
| >1: | INFINITY | 0.000000 | | |
| 2: | INFINITY | 0.000000 | | SBSL7_OHARA |
| XDE: 0.000000 | YDE: 0.000000 | | ZDE: 0.507713 | GLB G1 |
| | ADE: −10.000000 | BDE: 0.000000 | CDE: 0.000000 | |
| 3: | INFINITY | 0.000000 | | |
| XDE: 0.000000 | YDE: 0.000000 | | ZDE: 3.553892 | GLB G1 |
| | ADE: −10.000000 | BDE: 0.000000 | CDE: 0.000000 | |
| STO: | INFINITY | 0.000000 | | |
| XDE: 0.000000 | YDE: −0.174089 | | ZDE: 54.039651 | GLB G1 |
| | ADE: 0.000000 | BDE: 0.000000 | CDE: 0.000000 | |
| 5: | 135.56340 | 0.000000 | | SFSL5_OHARA |
| XDE: 0.000000 | YDE: −0.174089 | | ZDE: 54.139651 | GLB G1 |
| | ADE: 0.000000 | BDE: 0.000000 | CDE: 0.000000 | |
| 6: | −45.08961 | 0.000000 | | |
| XDE: 0.000000 | YDE: −0.174089 | | ZDE: 57.745962 | GLB G1 |
| | ADE: 0.000000 | BDE: 0.000000 | CDE: 0.000000 | |
| 7: | −83.16624 | 0.000000 | | SLAH60_OHARA |
| XDE: 0.000000 | YDE: −0.174089 | | ZDE: 57.845962 | GLB G1 |
| | ADE: 0.000000 | BDE: 0.000000 | CDE: 0.000000 | |
| 8: | 61.50079 | 0.000000 | | SNSL36_OHARA |
| XDE: 0.000000 | YDE: −0.174089 | | ZDE: 59.649118 | GLB G1 |
| | ADE: 0.000000 | BDE: 0.000000 | CDE: 0.000000 | |
| 9: | −49.05173 | 0.000000 | | |
| XDE: 0.000000 | YDE: −0.174089 | | ZDE: 64.157006 | GLB G1 |
| | ADE: 0.000000 | BDE: 0.000000 | CDE: 0.000000 | |
| 10: | 114.18768 | 0.000000 | | SLAH60_OHARA |

TABLE 4-continued

Numerical Example 4

| | RDY | THI | RMD | GLA | |
|---|---|---|---|---|---|
| XDE: 0.000000 | YDE: −0.174089 | ZDE: 64.257006 | | | GLB G1 |
| ADE: 0.000000 | BDE: 0.000000 | CDE: 0.000000 | | | |
| 11: | 76.19556 | 0.000000 | | SFSL5_OHARA | |
| XDE: 0.000000 | YDE: −0.174089 | ZDE: 66.060162 | | | GLB G1 |
| ADE: 0.000000 | BDE: 0.000000 | CDE: 0.000000 | | | |
| 12: | −88.75271 | 0.000000 | | | |
| XDE: 0.000000 | YDE: −0.174089 | ZDE: 73.272784 | | | GLB G1 |
| ADE: 0.000000 | BDE: 0.000000 | CDE: 0.000000 | | | |
| 13: | −317.87761 | 0.000000 | REFL | | |
| UDS: | | | | | |
| C02: −1.5262E−03 | C03: 2.0955E−07 | C04: 1.1412E−07 | | | |
| C05: 4.8311E−10 | C06: −2.6871E−11 | C20: −5.4267E−04 | | | |
| C21: 6.5636E−06 | C22: 1.6295E−07 | C23: 4.7866E−12 | | | |
| C24: −6.8866E−11 | C40: 5.2940E−09 | C41: 9.9791E−10 | | | |
| C42: −5.5120E−11 | C60: 3.5406E−11 | | | | |
| XDE: 0.000000 | YDE: −0.174089 | ZDE: 143.272784 | | | GLB G1 |
| ADE: −14.000000 | BDE: 0.000000 | CDE: 0.000000 | | | |
| 14: | −327.96980 | 0.000000 | REFL | | |
| UDS: | | | | | |
| C02: −1.4792E−03 | C03: 1.6505E−05 | C04: 2.7765E−07 | | | |
| C05: 1.3709E−09 | C06: −8.6752E−11 | C20: 1.1806E−03 | | | |
| C21: 2.0605E−05 | C22: 1.2929E−07 | C23: 3.1810E−10 | | | |
| C24: −1.2281E−10 | C40: −9.2830E−08 | C41: 2.2426E−09 | | | |
| C42: −1.1577E−10 | C60: 2.1012E−11 | | | | |
| XDE: 0.000000 | YDE: 33.641813 | ZDE: 79.674323 | | | GLB G1 |
| ADE: −42.000000 | BDE: 0.000000 | CDE: 0.000000 | | | |
| 15: | −637.61320 | 0.000000 | REFL | | |
| UDS: | | | | | |
| C02: −6.7912E−04 | C03: 7.0132E−06 | C04: 3.5251E−07 | | | |
| C05: 4.4735E−09 | C06: 7.5962E−11 | C20: 3.3408E−03 | | | |
| C21: 9.0411E−06 | C22: 8.9026E−07 | C23: 7.1560E−09 | | | |
| C24: −2.2344E−10 | C40: −1.0800E−06 | C41: 2.1792E−08 | | | |
| C42: −9.3267E−11 | C60: 4.6090E−10 | | | | |
| XDE: 0.000000 | YDE: −40.971569 | ZDE: 130.001685 | | | GLB G1 |
| ADE: −26.000000 | BDE: 0.000000 | CDE: 0.000000 | | | |
| 16: | 123.99598 | 0.000000 | REFL | | |
| UDS: | | | | | |
| C02: 3.7388E−03 | C03: −1.9756E−05 | C04: 1.2775E−07 | | | |
| C05: 1.4345E−09 | C06: −1.7657E−11 | C20: 6.0434E−03 | | | |
| C21: −2.8436E−05 | C22: 2.0843E−07 | C23: 2.2286E−09 | | | |
| C24: −3.0532E−11 | C40: 5.3818E−08 | C41: 6.2345E−10 | | | |
| C42: 1.6031E−12 | C60: 1.1799E−12 | | | | |
| XDE: 0.000000 | YDE: −46.468081 | ZDE: 51.397899 | | | GLB G1 |
| ADE: −18.000000 | BDE: 0.000000 | CDE: 0.000000 | | | |
| 17: | INFINITY | 0.000000 | | | |
| XDE: 0.000000 | YDE: −126.816532 | ZDE: 147.153454 | | | GLB G1 |
| ADE: −40.000000 | BDE: 0.000000 | CDE: 0.000000 | | | |
| 18: | INFINITY | 860.000000 | AIR | | |
| XDE: 0.000000 | YDE: −126.816532 | ZDE: 147.153454 | | | GLB G1 |
| ADE: −40.000000 | BDE: 0.000000 | CDE: 0.000000 | | | |
| IMG: | INFINITY | 0.000000 | | | |
| XDE: 0.000000 | YDE: 0.000000 | ZDE: 0.000000 | | | DAR |
| ADE: 42.530000 | BDE: 0.000000 | CDE: 0.000000 | | | |

TABLE 5

Numerical Example 5

| | RDY | THI | RMD | GLA | |
|---|---|---|---|---|---|
| OBJ: | INFINITY | 0.000000 | | | |
| XDE: 0.000000 | YDE: 0.000000 | ZDE: 0.000000 | | | DAR |
| ADE: −10.000000 | BDE: 0.000000 | CDE: 0.000000 | | | |

TABLE 5-continued

Numerical Example 5

| | RDY | THI | RMD | GLA | |
|---|---|---|---|---|---|
| >1: | INFINITY | 0.000000 | | | |
| 2: | INFINITY | 0.000000 | | SBSL7_OHARA | |
| XDE: 0.000000 | YDE: 0.000000 | ZDE: 0.507713 | | | GLB G1 |
| ADE: −10.000000 | BDE: 0.000000 | CDE: 0.000000 | | | |
| 3: | INFINITY | 0.000000 | | | |
| XDE: 0.000000 | YDE: 0.000000 | ZDE: 3.553892 | | | GLB G1 |
| ADE: −10.000000 | BDE: 0.000000 | CDE: 0.000000 | | | |
| STO: | INFINITY | 0.000000 | | | |
| XDE: 0.000000 | YDE: −0.174089 | ZDE: 54.039651 | | | GLB G1 |
| ADE: 0.000000 | BDE: 0.000000 | CDE: 0.000000 | | | |
| 5: | −97.52818 | 0.000000 | | SFSL5_OHARA | |
| XDE: 0.000000 | YDE: −0.174089 | ZDE: 60.942600 | | | GLB G1 |
| ADE: 0.000000 | BDE: 0.000000 | CDE: 0.000000 | | | |
| 6: | −38.98560 | 0.000000 | | | |
| XDE: 0.000000 | YDE: −0.174089 | ZDE: 67.206129 | | | GLB G1 |
| ADE: 0.000000 | BDE: 0.000000 | CDE: 0.000000 | | | |
| 7: | −98.94172 | 0.000000 | | SLAH60_OHARA | |
| XDE: 0.000000 | YDE: −0.174089 | ZDE: 71.861677 | | | GLB G1 |
| ADE: 0.000000 | BDE: 0.000000 | CDE: 0.000000 | | | |
| 8: | 143.10183 | 0.000000 | | SNSL36_OHARA | |
| XDE: 0.000000 | YDE: −0.174089 | ZDE: 74.993442 | | | GLB G1 |
| ADE: 0.000000 | BDE: 0.000000 | CDE: 0.000000 | | | |
| 9: | −57.77868 | 0.000000 | | | |
| XDE: 0.000000 | YDE: −0.174089 | ZDE: 82.822853 | | | GLB G1 |
| ADE: 0.000000 | BDE: 0.000000 | CDE: 0.000000 | | | |
| 10: | −971.83795 | 0.000000 | | SLAH60_OHARA | |
| XDE: 0.000000 | YDE: −0.174089 | ZDE: 85.216122 | | | GLB G1 |
| ADE: 0.000000 | BDE: 0.000000 | CDE: 0.000000 | | | |
| 11: | 383.39484 | 0.000000 | | SFSL5_OHARA | |
| XDE: 0.000000 | YDE: −0.174089 | ZDE: 88.347887 | | | GLB G1 |
| ADE: 0.000000 | BDE: 0.000000 | CDE: 0.000000 | | | |
| 12: | −81.62440 | 0.000000 | | | |
| XDE: 0.000000 | YDE: −0.174089 | ZDE: 100.874946 | | | GLB G1 |
| ADE: 0.000000 | BDE: 0.000000 | CDE: 0.000000 | | | |
| 13: | −475.44862 | 0.000000 | REFL | | |
| UDS: | | | | | |
| C02: −1.3316E−03 | C03: −2.7007E−07 | C04: −2.0036E−08 | | | |
| C05: 1.5458E−11 | C06: −1.1055E−12 | C20: −4.4476E−04 | | | |
| C21: 2.4247E−06 | C22: −5.1273E−08 | C23: 8.4072E−11 | | | |
| C24: −6.7504E−14 | C40: −3.3535E−08 | C41: 1.4044E−10 | | | |
| C42: 2.4683E−12 | C60: 1.3283E−12 | | | | |
| XDE: 0.000000 | YDE: −0.174089 | ZDE: 230.874946 | | | GLB G1 |
| ADE: −14.000000 | BDE: 0.000000 | CDE: 0.000000 | | | |
| 14: | −576.18087 | 0.000000 | REFL | | |
| UDS: | | | | | |
| C02: −1.0977E−03 | C03: 2.2750E−06 | C04: −6.5301E−08 | | | |
| C05: 4.4654E−10 | C06: −1.4974E−11 | C20: 1.1086E−03 | | | |
| C21: 5.5054E−06 | C22: −5.9548E−08 | C23: 7.0003E−10 | | | |
| C24: −5.3210E−12 | C40: −1.4722E−08 | C41: 3.1417E−10 | | | |
| C42: −2.3206E−12 | C60: −8.5527E−14 | | | | |
| XDE: 0.000000 | YDE: 70.246646 | ZDE: 98.432807 | | | GLB G1 |
| ADE: −41.000000 | BDE: 0.000000 | CDE: 0.000000 | | | |
| 15: | −9686.82349 | 0.000000 | REFL | | |
| UDS: | | | | | |
| C02: −3.0055E−04 | C03: −6.2199E−06 | C04: 4.4766E−07 | | | |
| C05: 6.8835E−10 | C06: −2.6294E−10 | C20: 2.8679E−03 | | | |
| C21: 1.2992E−05 | C22: −3.0173E−08 | C23: 4.0531E−10 | | | |
| C24: −3.7477E−11 | C40: −3.1398E−07 | C41: 6.7236E−09 | | | |
| C42: 4.3100E−11 | C60: 4.4210E−11 | | | | |
| XDE: 0.000000 | YDE: −83.466583 | ZDE: 210.112005 | | | GLB G1 |

TABLE 5-continued

Numerical Example 5

| RDY | THI | RMD | GLA |
|---|---|---|---|
| ADE: −29.500000 | BDE: 0.000000 | CDE: 0.000000 | |
| 16:    177.53352 | 0.000000 | REFL | |
| UDS: | | | |
| C02: 3.1073E−03 | C03: −1.5160E−05 | C04: 4.5552E−08 | |
| C05: 3.9294E−10 | C06: −1.3334E−12 | C20: 6.3588E−03 | |
| C21: −3.5171E−05 | C22: 1.9320E−07 | C23: 9.6978E−10 | |
| C24: −1.8033E−11 | C40: −2.0220E−08 | C41: 1.6275E−09 | |
| C42: −1.6513E−11 | C60: 4.3042E−12 | | |
| XDE: 0.000000 | YDE: −75.186788 | ZDE: 115.473509 | GLB G1 |
| ADE: −25.048835 | BDE: 0.000000 | CDE: 0.000000 | |
| 17:    INFINITY | 0.000000 | | |
| XDE: 0.000000 | YDE: −163.725679 | ZDE: 203.711056 | GLB G1 |
| ADE: −45.097670 | BDE: 0.000000 | CDE: 0.000000 | |
| 18:    INFINITY | 860.000000 | AIR | |
| XDE: 0.000000 | YDE: −163.725679 | ZDE: 203.711056 | GLB G1 |
| ADE: −45.097670 | BDE: 0.000000 | CDE: 0.000000 | |
| IMG:   INFINITY | 0.000000 | | |
| XDE: 0.000000 | YDE: 0.000000 | ZDE: 0.000000 | DAR |
| ADE: 42.530000 | BDE: 0.000000 | CDE: 0.000000 | |

TABLE 6

| | | Example 1 | Example 2 | Example 3 | Example 4 | Example 5 |
|---|---|---|---|---|---|---|
| Expression (2) | $|f\_a/f|$ | 5.58 | 4.68 | 6.29 | 4.74 | 7.99 |
| | panel vertical dimension | 18 | 19 | 18 | 18 | 18 |
| | panel horizontal dimension | 10 | 14 | 10 | 10 | 10 |
| | effective F number | 3 | 2.4 | 3 | 3 | 3 |
| | f_a | 65.61 | 59.52 | 70.2 | 57.05 | 98.85 |
| | f | −11.74 | −12.69 | −11.15 | −12.02 | −12.35 |
| | screen vertical dimension | 1356 | 1314 | 1362 | 1350 | 1358 |
| | screen horizontal dimension | 754 | 966 | 754 | 758 | 758 |
| | oblique incident angle θ | 42.6 | 50.9 | 42.6 | 42.6 | 42.6 |

In Embodiments 1 to 5, the plane including the central principal ray reflected by the plurality of reflective surfaces (having optical powers) is perpendicular to the screen (the projection surface). However, this is not essential in the present invention. Specifically, the plane including the central principal ray may be substantially parallel to the screen. Alternatively, the normal line to the image display surface of the image forming element (an image display device such as a reflective type liquid crystal panel, a transmissive type liquid crystal panel, a DMD, and a self-light-emission element) may be perpendicular to the normal line to the screen.

In such a case, a reflective member such as a plane mirror with no optical power can be used between the screen and the final reflective surface (the surface closest to the screen having an optical power) among the plurality of reflective surfaces to direct the optical path of the central principal ray toward the screen. This enables the optical path to be folded while the characteristics of the present invention are maintained, thereby achieving a further reduction in size and thickness of the whole apparatus. Preferably, two or three plane mirrors may be used.

In each of Embodiments 1 to 5, the optical axis of the refractive optical system may be substantially parallel to the screen or may be substantially perpendicular to the normal line to the screen. In this event, the normal line to the plane including the reference axis within the reflective optical system may be substantially perpendicular to the normal line to the screen. Alternatively, the normal line to the plane including the reference axis within the reflective optical system may be substantially parallel to the normal line to the screen.

As described above, according to each of Embodiments 1 to 5, it is possible to realize the projection optical system and the projection type image display apparatus, in which the reflective optical system receives the luminous flux with a large width emerging from the original image and passing through the refractive optical system, and excellent performance of image formation can be provided even with a small F number. In addition, it is possible to realize the projection optical system and the projection type image display apparatus, in which the reflective optical system is formed of the plurality of reflective surfaces to favorably correct the astigmatic difference, curvature of field, distortion, and trapezoidal distortion which require considerable correction due to the oblique projection at a large angle with respect to the projection surface, and the projection distance is short.

Particularly, when the intermediate image forming surface is formed in the projection optical system, the distortion due to the oblique projection can be corrected near the image forming surface. This also can reduce the size of the reflective surface.

When the intermediate image forming surface is formed within the reflective optical system, luminous flux for each field angle can be narrowed at the intermediate image forming surface, so that the size of the reflective surfaces can be reduced. In addition, the distortion and trapezoidal distortion can be corrected favorably with less influence on the spherical aberration and comatic aberration.

The projection optical system may have at least one reflective surface among the optical surfaces having optical powers disposed immediately before or after the intermediate image forming surface. This arrangement enables correction of the distortion and trapezoidal distortion with a small number of the optical surfaces.

The projection optical system may have a reflective surface as the optical surface having an optical power closest to the intermediate image forming surface to allow correction of the distortion and trapezoidal distortion without affecting the spherical aberration and comatic aberration.

It is possible to reduce the astigmatic difference occurring on the image surface due to the oblique projection at a large angle if the following expression is satisfied:

$$|f\_a/f|>2$$

where f_a represents the focal length of the refractive optical system and f represents the focal length of the projection optical system in the longitudinal direction of the projection surface.

The reflective surfaces formed of rotationally asymmetric surfaces can provide varying image magnifications depending on the azimuthal direction. Consequently, the distortion and trapezoidal distortion due to the oblique projection can be reduced.

In the projection optical system, at least one of the optical surfaces having optical powers disposed immediately before and after the intermediate image forming surface may have an asymmetric optical power in the azimuthal directions of 0 and 90 degrees, thereby making it possible to set different focal lengths depending on the azimuthal direction on the projection surface. It is thus possible to realize the projection optical system which can correct the distortion even at a large angle between the central principal ray and the projection surface.

In the projection optical system, each of the optical surfaces having optical powers disposed immediately before and after the intermediate image forming surface may be shaped in the azimuthal directions of 0 and 90 degrees such that the surface has a concave shape toward each azimuthal direction when the refractive optical system has negative curvature of field and the surface has a convex shape toward each azimuthal direction when the refractive optical system has positive curvature of field. This can realize the projection optical system which can correct the distortion with a small number of optical surfaces even at a large angle formed between the central principal ray and the projection surface.

The flat reflective surface provided on the optical path from the reflective optical system to the projection surface may fold and project luminous flux emerging from the reflective optical system onto the projection surface inclined with respect to the central principal ray. Thus, a large image can be provided even with a small depth of the apparatus.

While preferred embodiments have been described, it is to be understood that modification and variation of the present invention may be made without departing from the scope of the following claims.

What is claimed is:

1. A projection optical system which projects luminous flux from an original image onto a projection surface oblique to a central principal ray which is a principal ray of luminous flux traveling from the center of the original image to the center of a projected image, the projection optical system comprising:
   a refractive optical system which includes a plurality of refractive optical elements through which the luminous flux from the original image passes through; and
   a reflective optical system which includes a plurality of reflective surfaces and guides the luminous flux emerging from the refractive optical system to the projection surface, each of the surfaces having an optical power.

2. The projection optical system according to claim 1, wherein an intermediate image of the original image is formed within the reflective optical system.

3. The projection optical system according to claim 2, wherein at least one of optical surfaces each having an optical power disposed immediately before and after the position where the intermediate image is formed is a reflective surface.

4. The projection optical system according to claim 2, wherein an optical surface having an optical power closest to the position where the intermediate image is formed is a reflective surface.

5. The projection optical system according to claim 1, wherein the following expression is satisfied:

$$|f\_a/f|>2$$

where f_a represents a focal length of the refractive optical system and f represents a focal length of the projection optical system in a longitudinal direction of the projection surface.

6. The projection optical system according to claim 1, wherein at least one of the reflective surfaces is a rotationally asymmetric surface.

7. The projection optical system according to claim 2, wherein at least one of optical surfaces each having an optical power disposed immediately before and after the position where the intermediate image is formed has an asymmetric optical power in azimuthal directions of 0 and 90 degrees.

8. The projection optical system according to claim 2, wherein each of optical surfaces each having an optical power disposed immediately before and after the position where the intermediate image is formed is shaped in azimuthal directions of 0 and 90 degrees such that the surface has a concave shape toward each of the azimuthal directions when the refractive optical system has negative curvature of field.

9. The projection optical system according to claim 2, wherein each of optical surfaces each having an optical power disposed immediately before and after the position where the intermediate image is formed is shaped in azimuthal directions of 0 and 90 degrees such that the surface has a convex shape toward each of the azimuthal directions when the refractive optical system has positive curvature of field.

10. The projection optical system according to claim 1, wherein a normal line to a surface of the original image is substantially perpendicular to a normal line to the projection surface.

11. The projection optical system according to claim 1, wherein an optical axis of the refractive optical system is substantially perpendicular to a normal line to the projection surface.

12. The projection optical system according to claim 11, wherein the optical axis of the refractive optical system is substantially parallel to a normal line to a plane including a reference axis which is an optical path of the central principal ray within the reflective optical system.

13. The projection optical system according to claim 11, wherein the optical axis of the refractive optical system is substantially perpendicular to a normal line to a plane including a reference axis which is an optical path of the central principal ray within the reflective optical system.

14. A projection type image display apparatus comprising:
   an image forming element which forms an original image; and the projection optical system according to claim 1, which projects luminous flux from the original image onto a projection surface.

15. The projection type image display apparatus according to claim 14, further comprising a plane reflective surface provided on an optical path from the reflective optical system to the projection surface.

16. An image display system comprising:
the projection type image display apparatus according to claim 14, and
an image information supply apparatus which supplies image information for displaying an original image on the image forming element to the projection type image display apparatus.

* * * * *